(12) United States Patent
Ramezani et al.

(10) Patent No.: US 11,986,818 B2
(45) Date of Patent: May 21, 2024

(54) PORTABLE FORMULATING APPARATUS AND SYSTEM

(71) Applicant: ODH IP CORP., New York, NY (US)

(72) Inventors: Mahdi Ramezani, Rockville, MD (US); Akshaya Nair, Rockville, MA (US); Gordon Brezicki, Rockville, MD (US); Jonathan Samuel, Rockville, MD (US); Alec Nicewick, Rockville, MD (US); Griffin Whittredge, Rockville, MD (US)

(73) Assignee: ODH IP CORP., New York, NY (US)

( * ) Notice: Subject to any disclaimer, the term of this patent is extended or adjusted under 35 U.S.C. 154(b) by 0 days.

(21) Appl. No.: 18/189,987

(22) Filed: Mar. 24, 2023

(65) Prior Publication Data

US 2023/0302444 A1 Sep. 28, 2023

Related U.S. Application Data

(60) Provisional application No. 63/323,247, filed on Mar. 24, 2022.

(51) Int. Cl.
*B01L 3/00* (2006.01)
(52) U.S. Cl.
CPC ... *B01L 3/50255* (2013.01); *B01L 2300/0681* (2013.01); *B01L 2300/0867* (2013.01); *B01L 2300/0877* (2013.01)

(58) Field of Classification Search
CPC ......... B01L 3/50255; B01L 2300/0681; B01L 2300/0867; B01L 2300/0877
See application file for complete search history.

(56) References Cited

U.S. PATENT DOCUMENTS

| | | | |
|---|---|---|---|
| 2007/0228071 A1* | 10/2007 | Kamen | A61M 5/3287 222/52 |
| 2017/0354941 A1* | 12/2017 | Brown | B01F 35/7176 |
| 2018/0008943 A1* | 1/2018 | Corves | F16F 15/363 |
| 2020/0093698 A1* | 3/2020 | Oda | A61J 3/002 |
| 2020/0276582 A1* | 9/2020 | DeJohn | B01L 7/52 |
| 2021/0189322 A1* | 6/2021 | Rao | A61P 43/00 |

\* cited by examiner

*Primary Examiner* — Lyle Alexander
*Assistant Examiner* — Jonathan Bortoli
(74) *Attorney, Agent, or Firm* — POLSINELLI PC

(57) ABSTRACT

This disclosure provides systems and methods for the production of formulations of active pharmaceutical ingredients (APIs). In some embodiments, the disclosure provides an automated medicine formulation system comprising a portable and self-contained API formulating apparatus where the API and excipients are formulated to make a drug product meeting drug quality and safety specifications. The automated formulation system produces liquid formulations including, for example, injectable and intravenous medicines. The systems are capable of producing a plurality of individual sterile injectable doses of drug comprising a specific API and excipient(s), which can be formulated on demand in a GMP and FDA acceptable manner.

15 Claims, 13 Drawing Sheets

PORTABLE FORMULATING APPARATUS AND SYSTEM

CROSS-REFERENCE TO RELATED APPLICATIONS

This application claims priority from Provisional Application No. 63/323,247, filed Mar. 24, 2022, the entire contents of which are hereby incorporated by reference.

GOVERNMENTAL RIGHTS

This invention was made with government support under grant no. HR0011-16-2-0029 awarded by The Department of Defense. The government has certain rights in the invention.

FIELD OF THE INVENTION

This disclosure provides systems and methods for the production of formulations of active pharmaceutical ingredients (APIs).

BACKGROUND OF THE INVENTION

Product-on-demand systems and methods for the production of active pharmaceutical ingredients and formulated drug products are in development to provide important advantages over traditional chemical and pharmaceutical manufacturing systems and methods. Most drug products are prepared in large-scale discrete batch or semi-batch processes. The multi-step chemical synthesis, purification, formulation, and final packaging typically require large-scale facilities and expensive operations. The manufacturing typically uses batch processing at multiple locations. This approach generally requires long timescales to proceed from the synthesizing of intermediates, chemical products, and excipients, to the final formulation of the finished pharmaceutical product. As a result, production of a finished dosage form can require up to a total of 12 months, with large inventories of intermediates and drug product at several stages. Additionally, the facilities used to manufacture drug products are typically designed for the manufacturing of one particular drug product and require extensive disassembly, cleaning, cleaning validation, and reassembly in order to manufacture alternative drug products.

Accordingly, there is a need for systems and methods that can be used to produce pharmaceuticals on demand and can be reconfigurable to produce multiple products within the same system.

SUMMARY OF THE INVENTION

One aspect of the instant disclosure encompasses a system for the preparation of a liquid formulation. The system comprises a fluidic path comprising a plurality of conduits connected in a configuration operable to form a plurality of fluidic channels and a consolette comprising the fluidic path functionally attached thereon, wherein the consolette is operable to control flow of fluid through the fluidic path.

The fluidic path comprises a plurality of conduits connected in a configuration operable to form a plurality of fluidic channels. The fluidic path comprises an inlet conduit comprising an ingredient inlet port for introducing ingredients of a liquid formulation into the fluidic path and an outlet conduit comprising a dispensing port for dispensing the liquid formulation; a filter fluidically connected to the fluidic path, wherein the filter is operable to filter fluid pumped through one or more channel of the the fluidic path; and a mixing unit fluidically connected to the fluidic path, wherein the mixing unit is operable to mix the ingredients of the liquid formulation.

The consolette comprises a pump functionally attached to a frame, wherein the pump is operable to flow fluid through the plurality of fluidic channels; and a plurality of valves functionally attached to the frame and to a conduit, wherein each of the plurality of valves comprises an open position and a closed position, and wherein each valve is operable to allow flow of fluid through the conduit when in the open position, and prevent flow of fluid through the conduit when in the closed position. The plurality of valves are operable to be configured in a plurality of combinations of open and closed positions thereby directing the flow of fluid through the plurality of conduits of the fluidic path, thereby forming the plurality of fluidic channels.

In some aspects, the consolette further comprises a controller in functional communication with the pump and the plurality of valves, wherein the controller is operable to control the pump and the plurality of valves and thereby control the formation of the plurality of channels and control the flow of fluid through the plurality of fluidic channels. The controller can comprise a computer implemented control system, one or more input devices, one or more output devices, and any combination thereof.

The plurality of valves can be configured in a combination of open and closed positions to form a fill channel extending from the ingredient inlet port to the mixing unit. In some aspects, the plurality of valves are configured in a combination of open and closed positions to form a closed loop mixing channel extending from the mixing unit, one or more conduits, and back to the mixing unit. In other aspects, the plurality of valves are configured in a combination of open and closed positions to form a dispensing channel extending from the mixing unit through the filter to the fill port. In additional aspects, the fluidic path further comprises a waste port and optionally a waste container fluidically connected to the waste port. In some aspects, the plurality of valves are configured in a combination of open and closed positions to form a dispensing channel extending from the ingredient inlet port through the filter to the waste port. In other aspects, the plurality of valves are configured in a combination of open and closed positions to form a filter wash channel extending from the mixing unit through the filter to the waste port.

The filter can comprise a top section comprising a top vent port, a bottom section comprising a bottom vent port, a filter inlet port, and a filter output port. In some aspects, the fluidic path comprises a first filter purging path extending from the ingredient inlet port through the top vent port of the filter to the waste port, a second filter purging path extending from the ingredient inlet port through the bottom vent port of the filter to the waste port, and a filter priming path extending from the ingredient inlet port, through the filter inlet port and the filter output port of the filter to the waste port. In some aspects, the fluidic path comprises a filter wash path extending from the mixing unit through the filter inlet port and the filter output port of the filter, to the waste port.

In some aspects, the fluidic path comprises a dispensing path extending from the mixing unit through the filter inlet port and the filter output port of the filter, to the fill port. The mixing unit can comprise a mixing container and a mixing mechanism. In some aspects, the mixing mechanism is an orbital shaker. The system can further comprise an ingredients container fluidically attached to the ingredient inlet port and a formulation container fluidically attached to the dispensing port. In some aspects, the system further comprises one or more weighing mechanisms operable to weigh the mixing unit, the ingredients container, the formulation container or any combination thereof.

In some aspects, the system further comprises sensors in functional communication with components of the system, in functional communication with a fluid in the tubing, or both, wherein the sensors are operable to sense weight, fluid flow, temperature, pH, oxygen, pressure, concentration, and sensors that can detect specific compounds in the fluid.

BRIEF DESCRIPTION OF THE FIGURES

The following drawings form part of the present specification and are included to further demonstrate certain embodiments of the present disclosure. Certain embodiments can be better understood by reference to one or more of these drawings in combination with the detailed description of specific embodiments presented herein.

DETAILED DESCRIPTION

Figure 1:
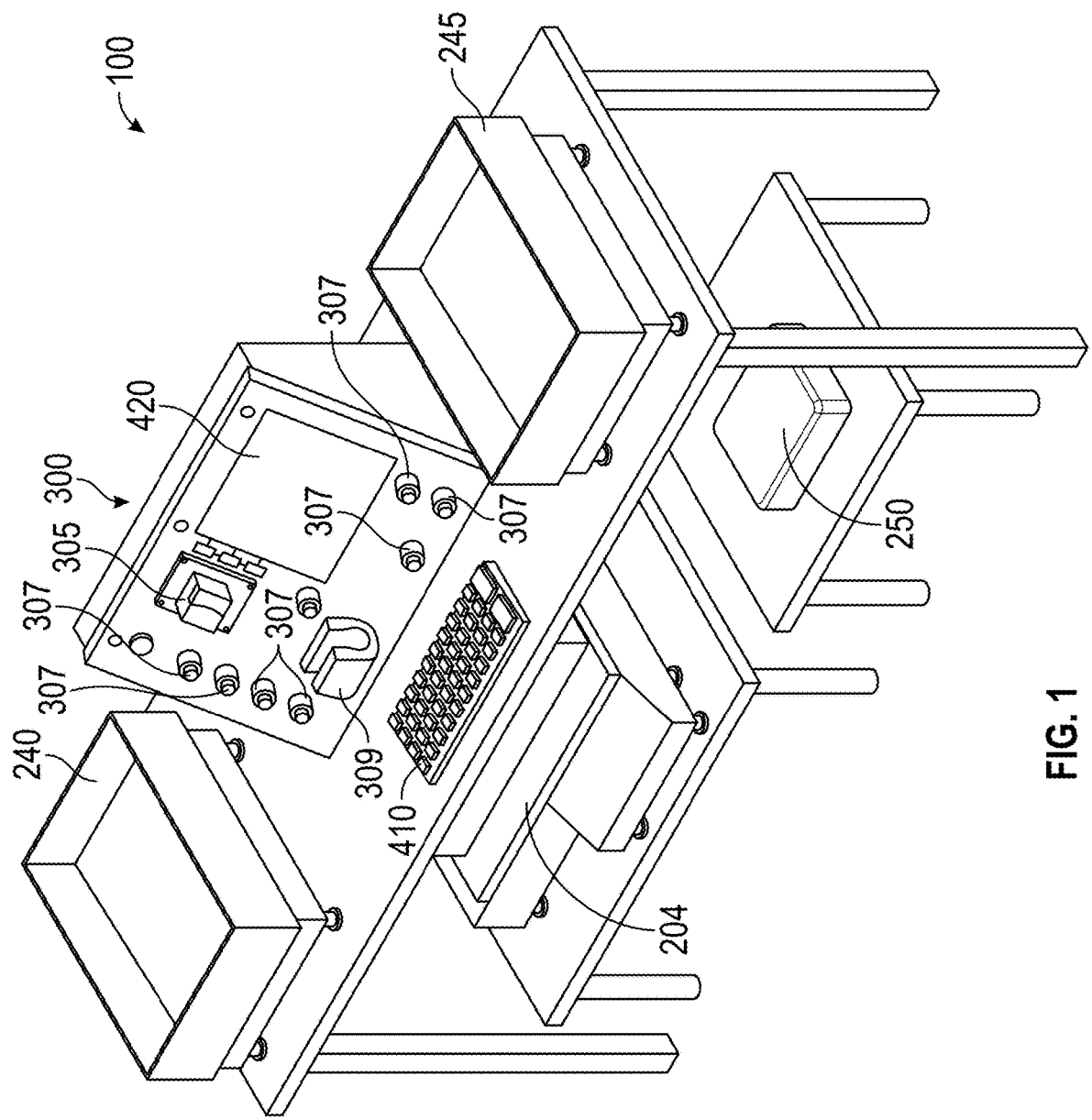
FIG. 1 is a perspective view of an aspect of a formulator system of the instant disclosure without a fluidic path attached thereon.

The devices, systems, methods, and computer program products for the production of formulations of active pharmaceutical ingredients (APIs) will be understood from the accompanying drawings, taken in conjunction with the accompanying description. It is noted that, for purposes of illustrative clarity, certain elements in various drawings may not be drawn to scale. Several variations of the system are presented herein. It should be understood that various components, parts, and features of the different variations may be combined together and/or interchanged with one another, all of which are within the scope of the present application, even though not all variations and particular variations are shown in the drawings. It should also be understood that the mixing and matching of features, elements, and/or functions between various variations is expressly contemplated herein so that one of ordinary skill in the art would appreciate from this disclosure that the features, elements, and/or functions of one variation may be incorporated into another variation as appropriate, unless described otherwise.

This disclosure provides systems and methods for the production of formulations of active pharmaceutical ingredients (APIs) starting from the API and one or more inactive ingredients. The automated formulation system produces liquid formulations including, for example, injectable and intravenous medicines. The systems are capable of producing a plurality of individual sterile injectable doses of drug comprising a specific API and excipient(s), which can be formulated on demand in a GMP and FDA acceptable manner.

I. System

One aspect of the present disclosure encompasses a system for the preparation of a liquid formulation (formulator). The formulator comprises a consolette and a fluidic path that, when attached to the consolette, can be configured into a plurality of fluidic channels. The plurality of fluidic paths can be formed in an operational sequence of a process for preparing the liquid formulation. The formulator system of the instant disclosure is compact and modular and can be reconfigured to produce multiple products within the same system.

(a) Consolette

The formulation system of the instant disclosure comprises a consolette. The consolette is operable to flow fluid through a fluidic path, and to control an operational sequence of a process for preparing the liquid formulation. The fluidic path can be as described in Section I(b) herein below.

The consolette comprises a frame to which a pump and a plurality of valves are functionally attached. The consolette can also comprise a filter holder for accommodating a filter of the fluidic path. The pump and plurality of valves are arranged in a configuration that can functionally accommodate the fluidic path. An aspect of a formulator of the instant disclosure can be seen in FIG. 6 and in FIG. 10.

The pump is operable to flow the fluid through the plurality of channels of the fluidic path. Any number of pumps can be used in a formulator of the instant disclosure provided the one or more pumps can collectively flow fluid through all fluidic channels of the formulator. For instance, the formulator can comprise a pump controlling the flow of fluid at each conduit of the fluidic path, at some conduits of the fluidic path, or at a single conduit of the fluidic path. In some aspects, the formulator comprises one pump functionally attached to one conduit of the fluidic path, wherein the pump is operable to flow the fluid through all the channels of the fluidic path. It will be recognized that in such aspects, all fluidic paths of the formulator share a single conduit at which the pump is controlling flow of fluid.

In some aspects, a pump of the instant disclosure can control the volumetric flow rate of the fluid in the fluidic path. The flow rate can and will vary depending on the formulation to be prepared, the size of conduit, and the specific fluidic path during an operational sequence of a process for preparing the liquid formulation, among other variables. For instance, during the step of purging the filter of the instant disclosure a volumetric flow rate can range from about 1 ml/min to about 300 ml/min. Conversely, the flow rates during the steps of filling the mixing container, the flow rate can range from about 900 ml/min to about 1100 ml/min. Accordingly, a suitable pump of the instant disclosure can comprise a broad range of flow rates to accommodate the requirements of the formulator and the process used to prepare the formulations. In some aspects, a pump of the instant disclosure can provide a volumetric range ranging from about 0.5 ml/min to about 5 L/min or more, from about 1 ml/min to about 300 ml/min, from about 1 ml/min to about 300 ml/min, or from about 900 ml/min to about 1100 ml/min.

There are various types of pumps, each with unique features and applications. Non-limiting examples of types of pumps include centrifugal pumps, diaphragm pumps, peristaltic pumps, and solenoid pumps. Overall, the type of pump selected for a particular application depends on various factors such as the nature of the fluid, flow rate, pressure, viscosity, and required level of precision and control.

In some aspects, the pump of the instant disclosure is a peristaltic pump. A peristaltic pump, also commonly known as a roller pump, is a type of positive displacement pump used for pumping a variety of fluids. The fluid is contained in a flexible tube fitted inside a circular pump casing. Most peristaltic pumps work through rotary motion, though linear peristaltic pumps have also been made. The rotor has a number of "wipers" or "rollers" attached to its external circumference, which compress the flexible tube as they rotate by. The part of the tube under compression is closed, forcing the fluid to move through the tube. Additionally, as the tube opens to its natural state after the rollers pass, more fluid is drawn into the tube. This process is called peristalsis and is used in many biological systems such as the gastrointestinal tract. Generally, there can be two or more rollers compressing the tube, trapping a body of fluid between them. The body of fluid is transported through the tube, toward the pump outlet. Peristaltic pumps can run continuously, or they can be indexed through partial revolutions to deliver smaller amounts of fluid. Peristaltic pumps can offer constant accurate flow rates for extended periods of time together with a long tubing lifetime without the risk of tubing rupture. In some aspects, the pump is a mid-flow process peristaltic pump. In some aspects, the pump is a 300 series panel mount pumps from Watson Marlow. In other aspects, the pump is a Masterflex® L/S® Easy-Load® Pump Head from Avantor.

Valves of the formulator of the instant disclosure are operable to form the fluidic paths of the formulator by directing the flow of fluid through the conduits. Each valve can be in a closed position to prevent fluid flow in a conduit, or in an open position to allow flow of fluid in a conduit. When attached to the consolette, one conduit is functionally attached to each valve. Accordingly, each valve can control the flow of fluid in the attached conduit. The plurality of valves are operable to be configured in two or more combinations of open and closed positions thereby directing the flow of fluid through two or more conduits of the fluidic channels, thereby forming the two or more fluidic channels.

Many types of valves are known in the art, including, by function, ball valves, butterfly valves, choke valves, diaphragm valves or membrane valves, gate valves, globe valves, knife valves, needle valves, pinch valves, piston valves, piston valves (steam engine), plug valves, solenoid valves, and spool valves. In general, valves of the instant disclosure provide an unobstructed flow path in a conduit with zero dead volume and provide for the conduit to be easily attached, removed and replaced, an important benefit for applications with strict hygiene requirements.

In some aspects, the plurality of valves are solenoid-operated or pneumatic pinch valves that are operable to open and close conduits for controlling flow of liquids and gases. Pinch valves have no areas or dead volume where fluid can become trapped. Further, no part of the valve can contact fluid in a conduit. Energizing the solenoid retracts or attracts the plunger, which opens or closes the conduit. De-energizing the solenoid will allow the plunger to return to its original state. In some aspects, the plurality of valves are NPV4-2D-06-24 valves from Clippard.

Figure 6:
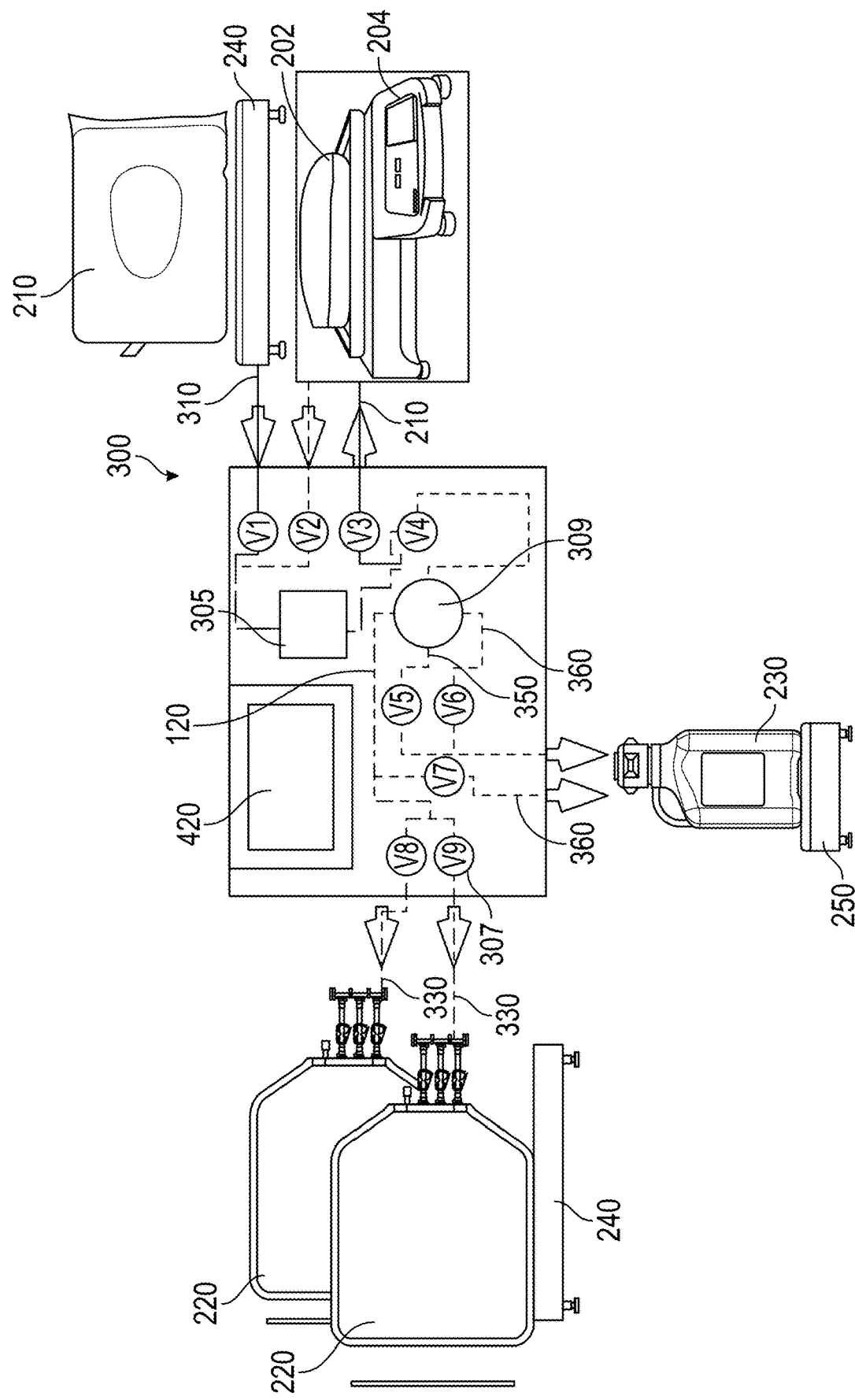
FIG. 6 shows an aspect of a formulator system.
Figure 10:
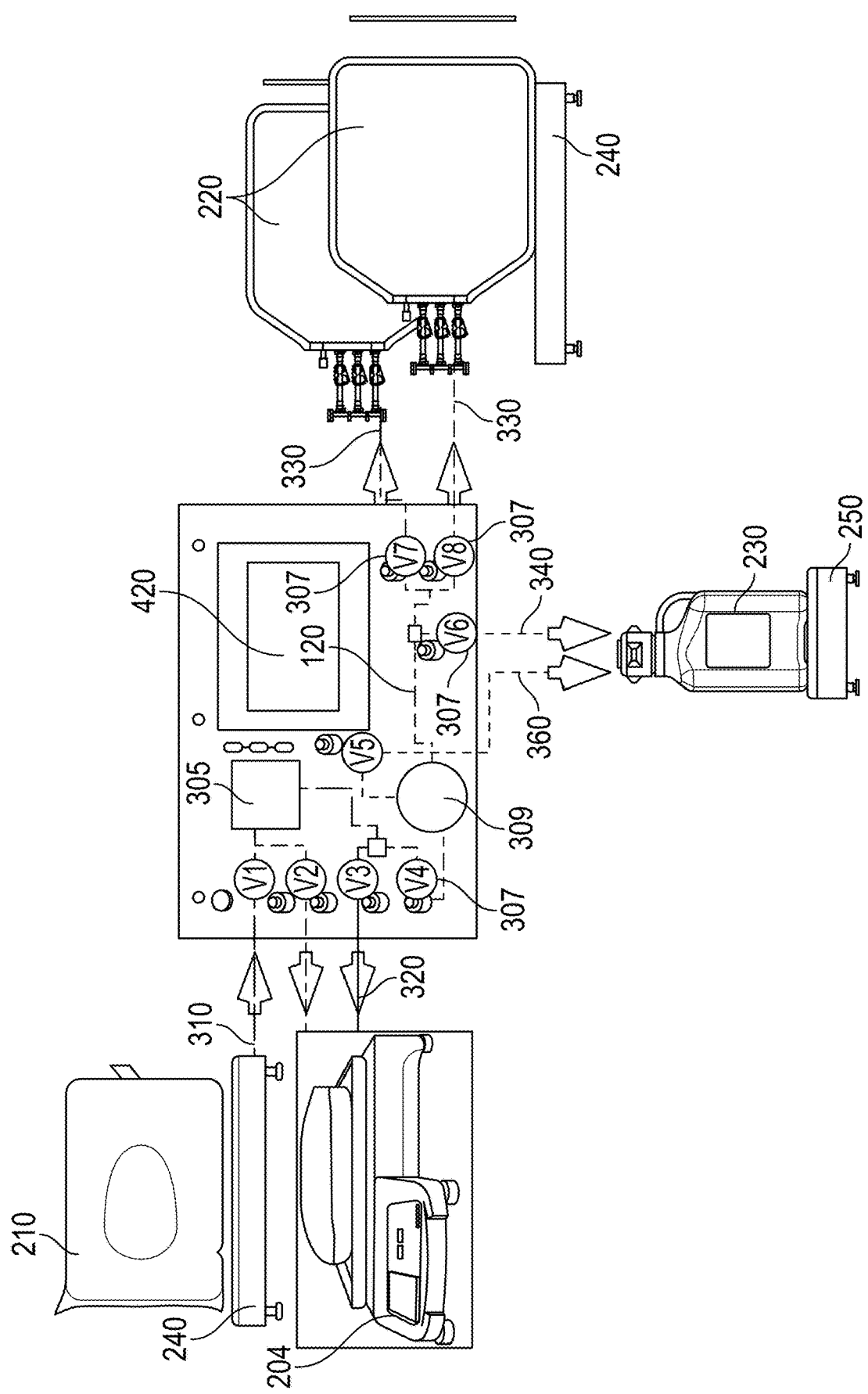
FIG. 10 shows an aspect of a formulator system.

The number of valves can and will vary depending on the formulation to be prepared and the material of the conduit among other variables. A formulator of the instant disclosure can comprise two or more valves. For instance, a formulator can comprise 2, 3, 4, 5, 6, 7, 8, 9, 10, 15, 20, 25, or 30 valves or more. The number of valves suitable for a formulator of the instant disclosure can and will vary depending on the process used for preparing the formulation on interest. For instance, in some aspects, when the formulator system is used to prepare a liquid formulation of cisatracurium, the consolette comprises one pump and nine valves. In one aspect, the pump and valves are attached onto the frame in a configuration as shown in FIG. 6. In some aspects, when the formulator system is used to prepare a liquid formulation of midazolam, the consolette comprises one pump and eight valves. In one aspect, the pump and valves are attached onto the frame in a configuration as shown in FIG. 10. It will be recognized that not all valves of a consolette have to be used during a process. Accordingly, in the aspects of cisatracurium and midazolam, midazolam can be prepared using a console comprising nine volves, with one of the valves left unused.

In some aspects, the consolette further comprises a controller in functional communication with the pump and the plurality of valves, wherein the controller is operable to control the flow rate of fluid through the two or more fluidic channels and control the valves to thereby form each of the plurality of fluidic channels, to thereby control an operational sequence of a process for preparing the liquid formulation. If the system also comprises additional components such as weight scales, stirring mechanisms, shakers, and the like, the controller can also be in functional communication with all components of the system to execute an operational sequence of a process thereby automatically for preparing the liquid formulation. A controller can be as described in Section I(c) herein below.

(b) Fluidic Path

The formulator of the instant disclosure also comprises a fluidic path. The fluidic path connects input material, a formulation container, optionally a waste container, and provides a mixing unit and a filter. The fluidic path comprises a plurality of conduits (tubing) connected with fluidic connectors into a configuration to form a plurality of channels through which fluid can flow. A fluidic path is assembled in a configuration suitable for attaching to a consolette and for the intended formulation to be prepared using the formulator of the instant disclosure. The fluidic path comprises a configuration operable to form a plurality of fluidic paths when attached onto the console. The network comprises inlets and outlets for connecting ingredients containers, formulation containers, and waste containers, among other components that could be connected. In some aspects, the fluidic path comprises an inlet conduit comprising an ingredient inlet port for introducing ingredients of a liquid formulation into the fluidic path and an outlet conduit comprising a dispensing port for dispensing the liquid formulation. In some aspects, the fluidic path further comprises a waste port and optionally a waste container fluidically connected to the waste port.

Figure 2:
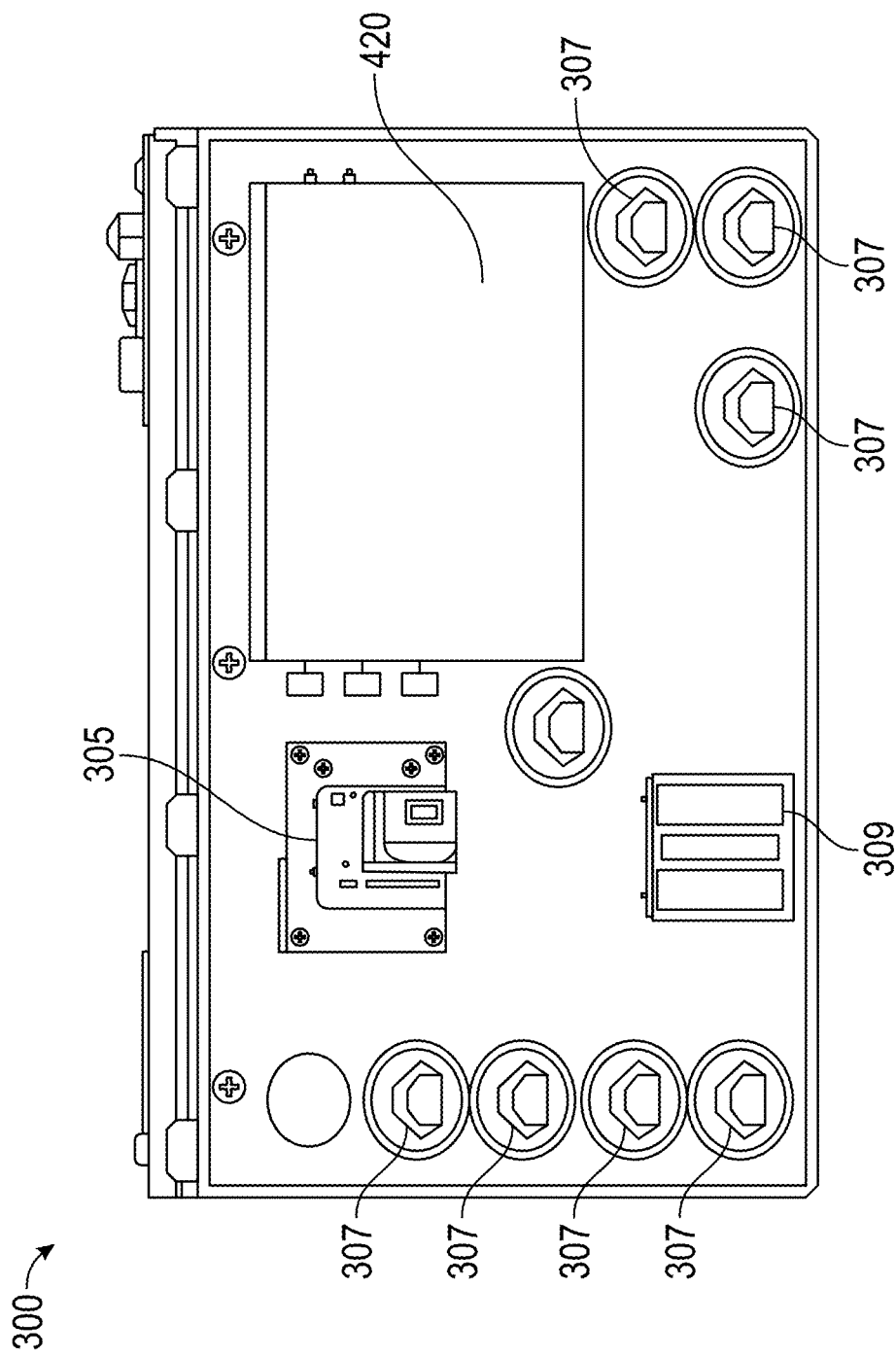
FIG. 2 shows an aspect of a consolette.
Figure 3:
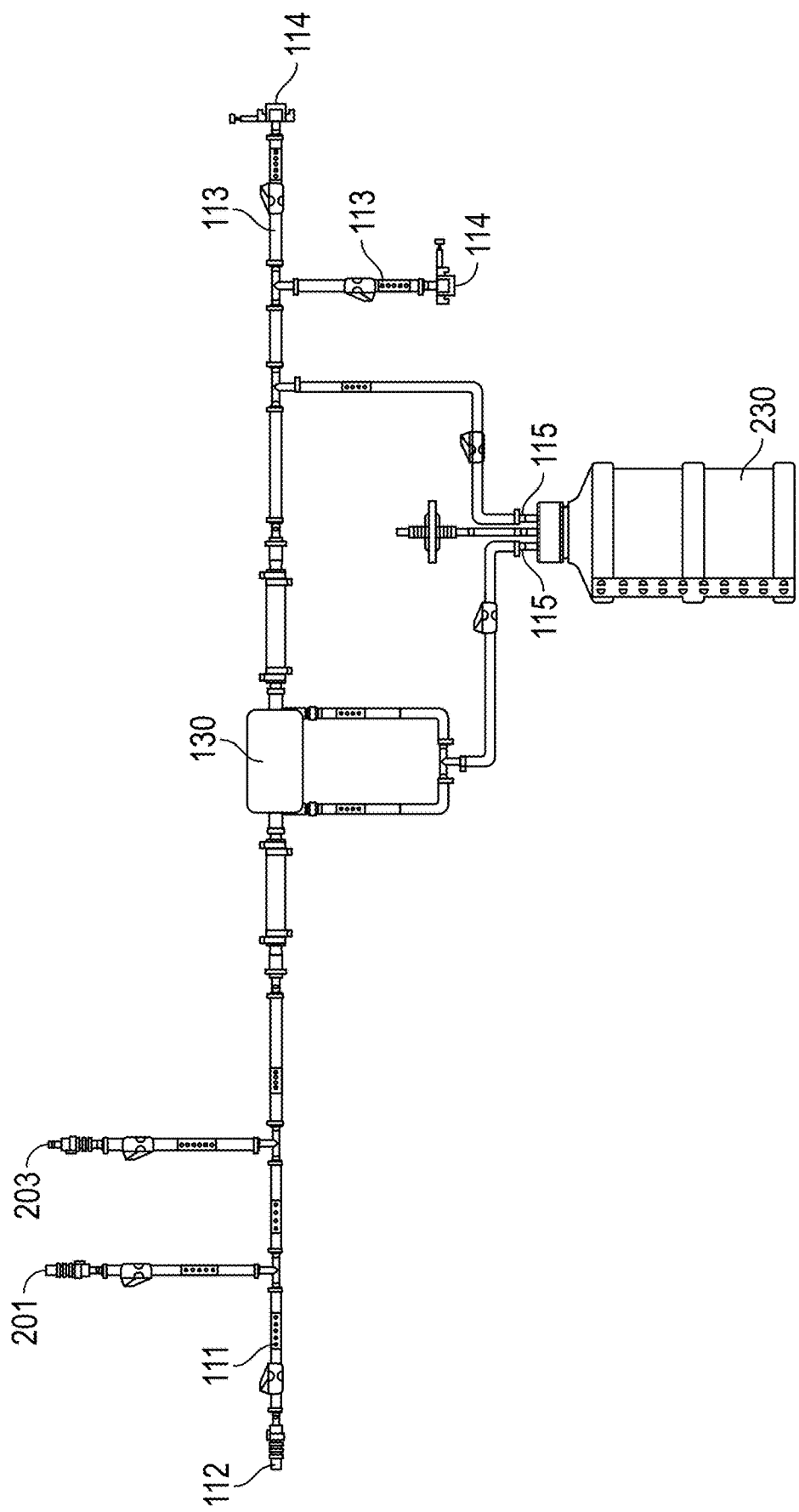
FIG. 3 shows an aspect of a fluidic path with a filter and waste container attached.
Figure 8:
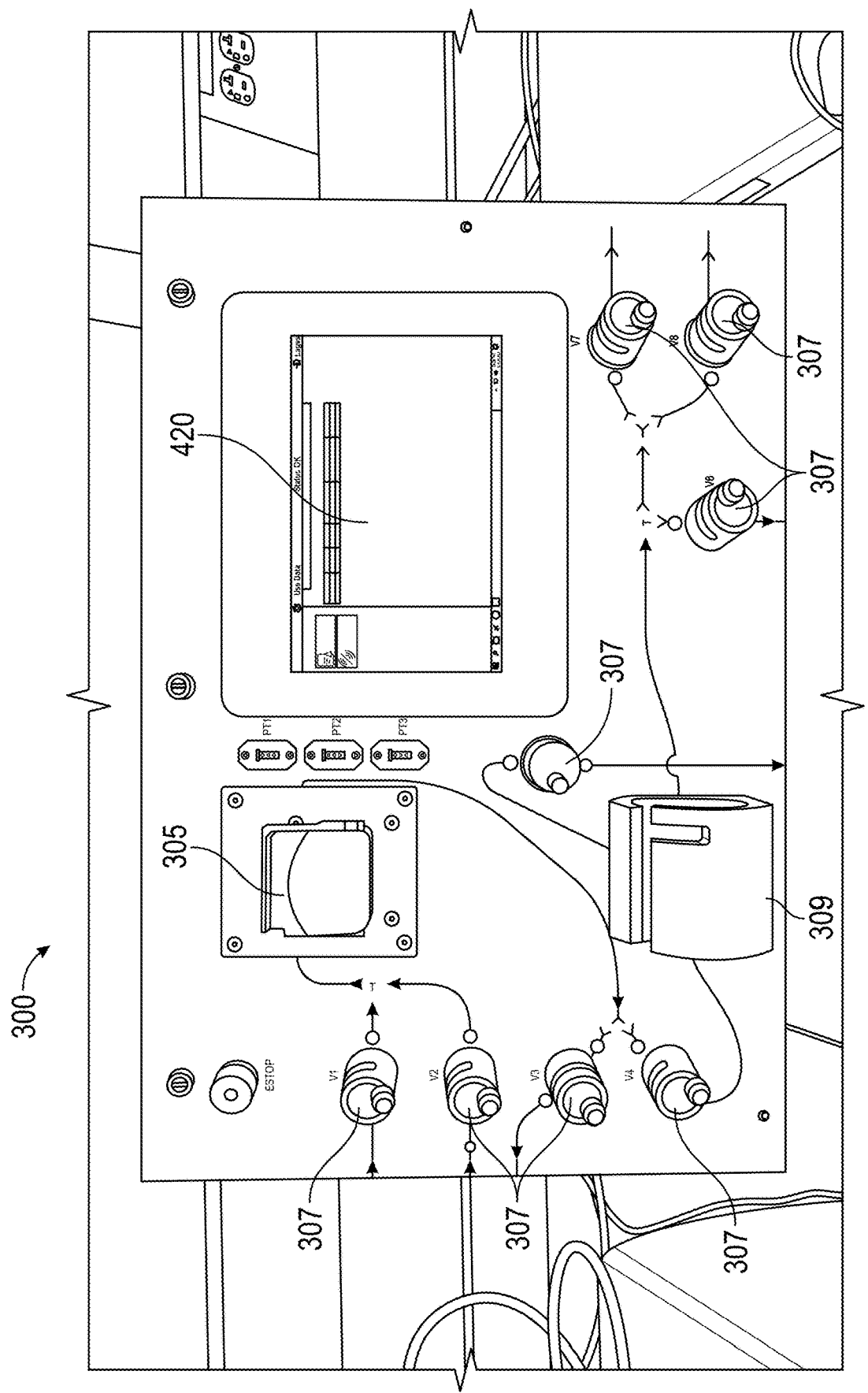
FIG. 8 shows an aspect of a consolette.

In some aspects, the fluidic path comprises a configuration shown in FIG. 3. In one aspect, the fluidic path comprises a configuration shown in FIG. 3 can be used with a consolette of FIG. 2. In one aspect, the fluidic path comprises a configuration shown in FIG. 3 can be used to prepare a formulation of cisatracurium. In some aspects, the fluidic path comprises a configuration shown in FIG. 11A and FIG. 11B. In one aspect, the fluidic path comprises a configuration shown in FIG. 11A and FIG. 11B can be used with a consolette of FIG. 8. In one aspect, the fluidic path comprises a configuration shown in FIG. 11A and FIG. 11B can be used to prepare a formulation of midazolam.

In some aspects, the fluidic path is assembled using conduits and connectors on site before each formulation process is performed. The fluidic path of the formulator of the instant disclosure can also be pre-assembled and sterilized to facilitate operation and improve safety and quality. When a fluidic path is pre-assembled and optionally sterile, and can be replaced after a production process with another pre-assembled and sterile fluidic path, thereby facilitating the ability to quickly accommodate multiple runs and different formulation processes being performed by the formulator.

Figure 11A:
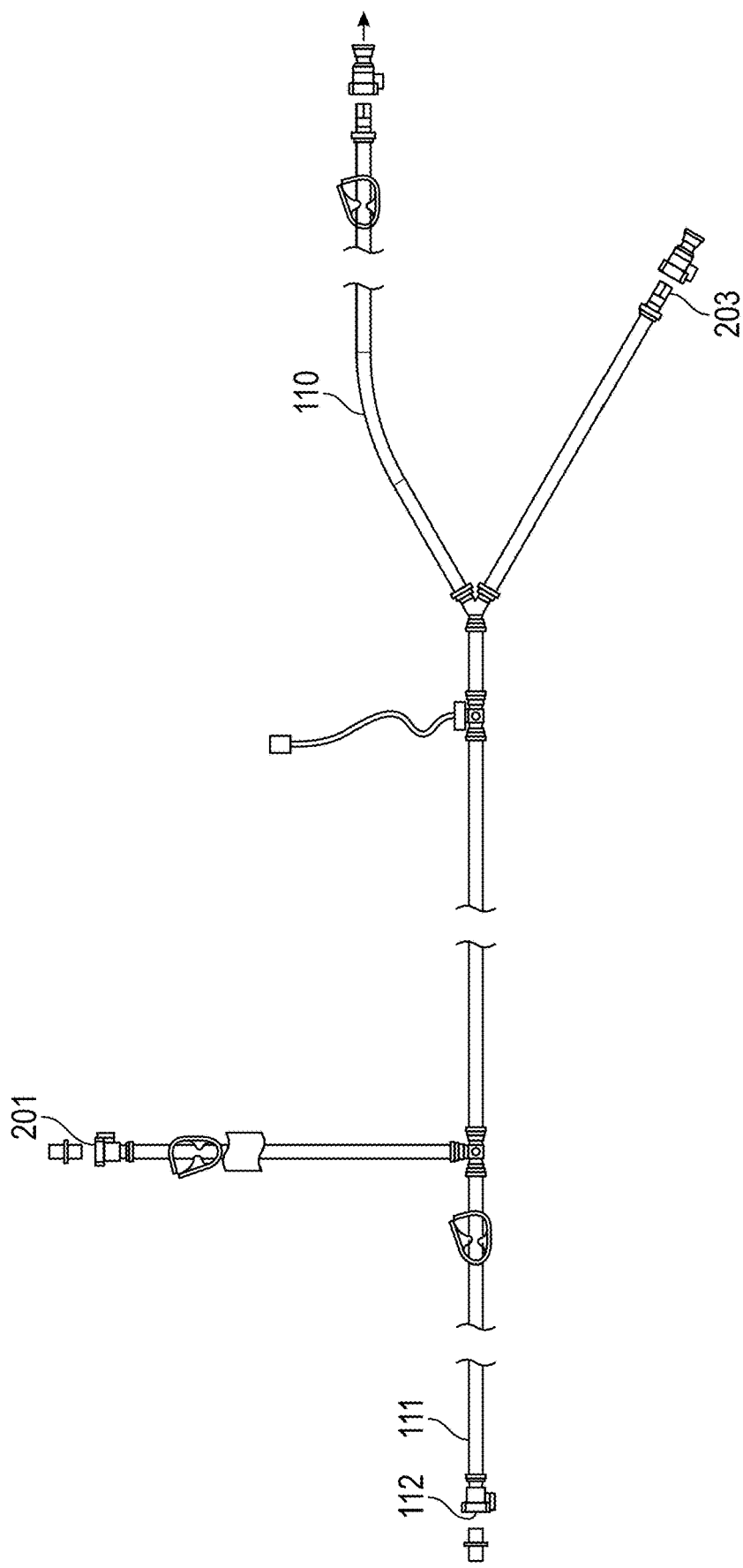
FIG. 11A shows an aspect of a fluidic path.
Figure 11B:
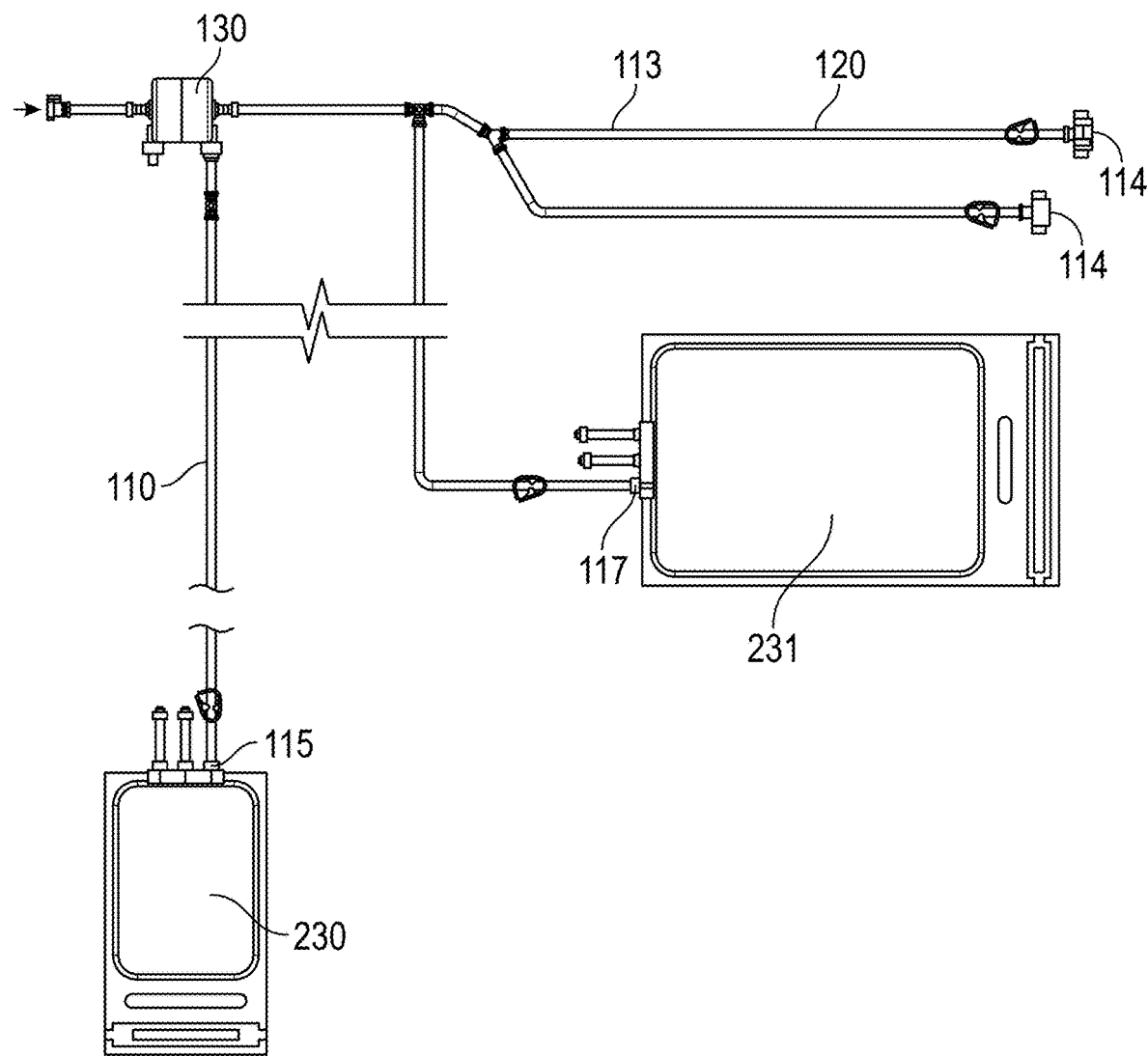
FIG. 11B shows an aspect of a fluidic path with a filter, a purge waste container, and filter prime waste container attached.

In some aspects, the filter in this fluidic path sterilizes the drug product and all the parts and procedures after the filter are critical to maintaining product sterility. Hence, the fluidic path can be divided into two major sections; prefilter where non-aseptic connections such as miniature protector connectors (MPC) can be used and postfilter where only aseptic connections such as AseptiQuick (AQG) connectors can be used. Accordingly, MPC connectors can accommodate both ingredients container connections and mixing container connections since both of the components are used before filtering (sterilizing) and AQG connectors can accommodate connections to fill containers. An aspect of the fluid path shown in in FIG. 11A and FIG. 11B provides an example where the fluid path can be in two separate sections. FIG. 11A shows the pre-filter section of the fluid path, and FIG. 11B shows the post-filter section of the fluid path.

The tubing and connectors can be manufactured from material suitable for use with other components of the formulator of the instant disclosure. Such materials are well known to those of skill in the art and are generally suitable for use in pharmaceutical grade manufacturing. For example, tubing material (and connectors) suitable for a formulator of the instant disclosure generally includes a chemically inert material, such as chemically inert polymers including inert fluoropolymers like polytetrafluoroethylene (PTFE), ethylene-tetrafluoroethylene (ETFE) or perfluoroalkoxy copolymer PCTFE (polychlorotrifluoroethylene), ECTFE (polyethylenechlorotrifluoroethylene), PFA or MFA (perfluoroalkoxy polymer; Teflon™) polyetheretherketone (PEEK), fluoropolymers such as PVF (polyvinylfluoride), PVDF (polyvinylidene fluoride), FFPM/FFKM (Perfluorinated Elastomer [Perfluoroelastomer]), FPM/FKM (Fluoroelastomer [Vinylidene Fluoride based copolymers]), FEPM (Fluoroelastomer [Tetrafluoroethylene-Propylene]), PFPE (Perfluoropolyether), Perfluoropolyoxetane, fluorinated ethylene propylene (FEP), or any combination thereof. In some aspects, the conduit is Pumpsil platinum-cured silicone tubing, PureWeld® XL-high performance TPE tubing, thermoplastic tubing such as Bioprene.

The fluidic path of the formulator of the instant disclosure can be pre-assembled and sterilized to facilitate operation and improve safety and quality. The filter in this fluidic path sterilizes the drug product and all the parts and procedures after the filter are critical to maintaining product sterility. Hence, the fluidic path can be divided into two major sections; prefilter where non-aseptic connections (MPC) can be used and postfilter where only aseptic connections (AQG) can be used. Accordingly, MPC connectors can accommodate both ingredients container connections and mixing container connections since both of the components are used before filtering (sterilizing) and AQG connectors can accommodate connections to fill containers. There is also a carboy in the fluidic path that functions for waste accumulation and is fluidically connected to both sides of the filter. As such, it is critical that there is no back flow from the waste container as it could impact product integrity.

A. Mixing

The mixing unit of the fluidic path generally comprises a mixing container and a mixing mechanism. The mixing unit can comprise a mixing unit inlet port through which ingredients enter, and a mixing unit outlet port through which the formulated product exits into the fluidic path. In some aspects, the mixing container is a bioprocess container. In some aspects, the mixing container is a single use bioprocess container.

The formulator of the instant invention comprises a mixing mechanism for mixing the reaction media in the process chamber to ensure that sufficient agitation/stirring of a formulation can occur to ensure proper mixing, emulsifying, dissolution of ingredients, or any combination thereof. Mixing mechanisms can also be very useful in heat transfer applications when it is important that the fluids are maintained at a certain temperature. Suitable mixing mechanism are readily known to individuals of skill in the art. Non-limiting examples of suitable mixing mechanisms include shakers and stirrers.

Stirrers can be overhead stirrers or magnetic stirrers. A magnetic stirrer comprises a magnetic bar placed within a liquid which provides the stirring action. The stir bar's motion is driven by another rotating magnet or assembly of electromagnets in the stirrer device, beneath the vessel containing the liquid. Stir bars are typically coated in PTFE, or, less often, in glass; the coatings are intended to be chemically inert, not contaminating or reacting with the reaction mixture they are in. Glass may be viable as an alternative if PTFE is unsuitable due to high temperature or chemical attack.

An overhead stirrer generally comprises a shaft comprising an impeller which extends through a port (mixing port) in the mixing container. For driving the stirrer, a drive mechanism such as a motor or other driving device may be employed, typically outside the mixing unit container. Any motor capable of providing the appropriate torque, speed and power can be used in a device of the instant disclosure. For instance, a motor of the instant disclosure can be a brushed DC electric motor, a brushless DC electric motor, a fractional horsepower motor, a servo motor, a three-phase AC synchronous motor, a stepper motor, a pneumatic motor, or any combination thereof.

It will be noted that a motor can further comprise parts operable to improve or adjust the performance of the motor or improve or adjust the connection of the motor to the mixing mechanism and the mixing container. For instance, the motor can further comprise a gearbox to adjust speed and torque to suit the needs of a process in the mixing unit. For instance, a gearbox can be added to a motor to decrease the speed of the motor and increase the torque to suit process needs. Further, the motor can comprise a flexible coupling connecting the motor to the shaft of the mixing unit. The function of a flexible coupling is to transmit torque from the motor to the agitator assembly shaft while making allowances for minor shaft misalignment and shaft end position changes between the two machines.

Impellers can be classified as either laminar (viscous) or turbulent impellers. The type and geometry of impeller used will vary from process to process and can be determined experimentally. For situations involving very viscous fluids where laminar mixing is present, the diameter of the impeller can approach the diameter of a mixing container. The larger impellers aid in the transport of momentum throughout the mixing container and ensure that the fluid is moving.

Some common but non-limiting geometries of laminar impellers are the ribbon impeller, the screw impeller, and the anchor impeller.

Some common but non-limiting geometries for radial flow mixers include disk style flat blade turbines and curved blade turbines, while some common axial flow impellers are the propeller and pitched blade turbine. Turbulent mixers can be further categorized as axial or radial flow impellers, among other types. Axial flow impellers cause the tank fluid to flow parallel to the impeller's axis of rotation, while radial flow impellers cause the tank fluid to flow perpendicular to the impeller's axis of rotation. Axial flow impellers can be further broken down into paddle, turbine, screw-type, helical blade, anchor, gate propeller, to name but a few. Axial flow impellers are very useful in mixing solid-liquid suspensions because they prevent the solid particles from settling at the bottom of the tank. Radial flow impellers should be used in situations where high shear rates are needed, such as in dispersion processes.

In some aspects, the stirring mechanism is a shaker. Non-limiting examples of shakers include vortex shakers, platform shakers, rocking shaker, orbital shakers, or the like. In some aspects, the mixing mechanism of the instant disclosure is a platform shaker. In some aspects, the mixing mechanism of the instant disclosure is an orbital shaker.

B. Filtration

The network also comprises a filter fluidically connected to the fluidic path, wherein the filter is operable to filter fluid pumped through the fluidic path; and a mixing unit fluidically connected to the fluidic path, wherein the mixing unit is operable to mix the ingredients of the liquid formulation.

A filter comprises a filter in a filter container. The filter container is operable to accept and secure one or more filters. Filter containers can comprise adapters or locating mounts to secure the filter in the consolette. The filter can comprise a filter inlet through which formulated but yet unfiltered formulations enter and a filter outlet through which filtered formulations exit after passing through the filter in the filter container. In some aspects, the filter comprises a top section comprising a top vent port, a bottom section comprising a bottom vent port, in addition to the filter inlet port, and a filter output port.

The formulator system of the instant disclosure can comprise one or more filters. For instance, the system can comprise 1, 2, 3, 4, 5, 6, 7, 8, 9, 10, or more filters. Additionally, each filter can comprise one or more filters in a filter container. For instance, each filter can comprise 1, 2, 3, 4, 5, 6, 7, 8, 9, 10, or more filters in a container. Each filter can provide a stage of filtration in a formulation process by removing one or more contaminants in the fluid streams.

As used herein, the terms "filtration," "filtering," and "filter," are used in their broadest sense to refer to the capturing, sequestering, absorbing, or adsorbing particulate materials or chemical or biological compounds as well as for neutralizing these contaminants in the fluid stream. Nonlimiting examples of filters are described below.

Filters can comprise natural or synthetic material having a surface with which contaminants come in direct contact for removal of the contaminants. The surface can be used as support or substrate for reactive or catalytic material that can absorb, adsorb, or neutralize contaminants in liquid streams. For instance, surface can be a plate onto which ionized particles attach during filtering. The surface can also be a porous structure permeable to liquids and gases. The pores can be smaller than the size of particulate material to be removed from the liquid streams. Other filters can comprise no pores or larger pores intended to provide a surface area with which some components of the liquid streams can come into contact to absorb, adsorb, or neutralize some contaminants.

Filters generally have, but are not limited to, the following properties: (1) an appropriate porosity (that is, the pores should be of such a size that allows sufficient flow and sufficient contact of liquid contents with the filter); (2) chemical resistance; (3) sufficient mechanical strength; and (4) thermal resistance at the temperature at which the filtration is carried out. Filters can comprise a metallic material such as steel, copper, aluminum, nickel, or silver, or any combination and alloy thereof. Filters can also comprise nonmetallic material such as asbestos, glass, cotton, wool, polyvinyl chloride, polyethylene terephthalate, molded and sintered powdered ceramics, metals, glass, synthetic materials, and can be in the form of cloth or unwoven fibers. Filters can also comprise beds of unconsolidated particles of stone, coal, charcoal, coke, diatomaceous earth, sand, clay, or neutralizing compounds used during treatment of fluid streams.

Filters can be particulate filters operable to capture, sequester, absorb, or adsorb particulate materials or noxious chemicals. Non-limiting examples of particulate filters include activated metal catalysts, and filters comprising fibrous, or porous materials which remove solid particulates. Non-limiting examples of porous materials include a) filtration fabric also known as "paper" or rolled goods; b) synthetic filtration fabrics often referred to as "non-wovens" such as polypropylene, polyethylene, polystyrene, and related polyolefins; fiberglass; polyamides such as nylon (6 and 6/6), KEVLAR, NOMEX; polyesters such as DACRON; polyacrylates, polymethacylates, polyacryonitrile such as ORLON, polyvinyl chlorides and related materials, such as polyvinylidene chloride; polytetrafluoroethylene (PTFE); polyurethanes; copolymers of the above materials; and combinations thereof; c) natural filtration fabric such as cellulose and other paper-based filters; wool; cotton; fiber glass, carbon fibers; and combinations thereof; d) metal filtration filters such as woven wire, perforated metal and sintered metals; (e) woven fabric made from fibers such as cotton, nylon 6, polytetrafluorethylene (PTFE), nylon 6.6, nylon 11, nylon 12, HALAR ethylene chlorotrifluoroethylene (E-CTFE), polyester PBT, Polyester PET, polypropylene, acrylics, polyvinyl-den fluoride (PVDF), polyphosphate sulfide (PPS) and high density polyethylene; and (f) filter aids such as adsorbents like diatomaceous earth, perlite, activated carbon, carbon black and related materials, anthracite, silicas, aluminas, and combinations thereof.

Activated carbon is a porous material that can adsorb volatile chemicals on a molecular basis, but does not remove larger particles. The adsorption process when using activated carbon must reach equilibrium thus it may be difficult to completely remove contaminants. Activated carbon is merely a process of changing contaminants from a gaseous phase to a solid phase. Activated carbon can be used at room temperature and has a long history of commercial use. Other materials can also absorb chemicals but at a higher cost.

Activated metals can be used to catalyze reactions such as oxidation/reduction reactions to neutralize some contaminants. Non-limiting examples of suitable activated metals include activated alumina such as γ-alumina, O-alumina, zirconia, cerium-zirconium composite oxide, silica, various kinds of zeolites, copper (Cu), cobalt (Co), nickel (Ni), lanthanum (La), manganese (Mn), iron (Fe), vanadium (V), silver (Ag), and cerium (Ce), neodymium (Nd), praseodymium (Pr), titanium (Ti), chromium (Cr), zinc (Zn), tin (Sn), niobium (Nb), molybdenum (Mo), hafnium (Hf), yttrium (Y), tungsten (W), and alloys comprising any combination thereof. The metals can be deposited onto filter media surfaces in the air filter in combination with other material for optimal catalysis at the surface of the filter media.

Photocatalytic oxidation systems are able to completely oxidize and degrade organic contaminants, including Volatile Organic Compounds (VOCs). (PCO) uses short-wave ultraviolet light (UVC), commonly used for sterilization, to energize the catalyst (usually titanium dioxide ($TiO_2$)) and oxidize bacteria and viruses.

The filter or combinations of filters and the number of filters in a formulator of the instant disclosure can and will vary depending on the process and ingredients of the formulations to be prepared using a formulator if the instant disclosure. Similarly, the size and number of filtration units can and will vary depending on the performance specifications of the formulator, as well as on the type and number of filters. A combination of filters can include one or more filters that form multiple stages of filtration, wherein each stage of filtration can capture, sequester, absorb, or adsorb particulate materials or noxious chemical or biological compounds as well as the neutralization of these contaminants. In some aspects, a combination of filters can be used to treat liquid streams in multiple stages wherein each filter can provide a stage of filtration for removing or neutralizing one or more contaminants. Individuals of skill in the art will recognize that sizing and number of filter units and filters can be adjusted to allow sufficient flow, and to provide effective treatment of contaminants when considered with the other components of the formulator system.

In some aspects, the filter is a sterilizing filter. In some aspects, the filter is a capsule sterilizing filter that can be installed inline in the fluidic path. In some aspects, the filter is a sterilizing filter using a 0.2 μm membrane. In some aspects, the filter is a Kleenpak fluorodyne 0.2 μm capsule filter.

(c) Other Components

In addition to the ingredient inlet port, the dispensing port, and optionally the waste port, among others, the formulator can further comprise additional ports in fluid communication with the fluidic path of the formulator for inserting tubing for material input and output, as well as for attaching sensors, filters, connectors, probes, samplers, or other devices. Devices include, but are not limited to a filter, a connector, a probe, a sensor, a sampler, and other devices. The ports can be located anywhere in the fluidic path. It will be understood that the tubing and sensors can be connected to the ports by using any desirable connection technology capable of providing a seal at the port. For instance, ports can comprise industry standard thread sizes that can be used for attaching various components and tubing to the CFWD. Non-limiting examples of industry standard thread sizes are the American National Standard Pipe Thread standard, British Standard Pipe threads, ISO 7-1, 7-2, 228-1, and 228-2 threads, among others. In some aspects, the ports comprise national pipe standards screw threads. They include both tapered and straight thread series for various purposes, including rigidity, pressure-tight sealing, or both. The types are named with a symbol and a full name. Examples of the symbols include NPT (national pipe taper), NPS (National pipe straight), NPSI (National pipe straight-intermediate), NPSC (National pipe straight-coupling), NPSL (National pipe straight-locknut), and NPSM (National pipe straight-mechanical), among others. In some aspects, the ports comprise Female National Pipe Taper (FNPT).

Non-limiting examples of sensors that may be used in conjunction with formulator devices of the instant invention include sensors for fluid flow, temperature, pH, oxygen, pressure, concentration, and sensors that can detect specific compounds in a reaction medium. Fluid flow sensors can sense the rate of addition of ingredients, the flow rate of dispensing a formulated product, the flow rate of waste disposal, and other flow rates in the fluidic path which can be adjusted in an adaptive response to real time, or near real time, touchless measurements. Other devices can include pressure relief or other valves such as rupture disks, connectors such as Luer connectors, MPC connectors, compression fittings, quick disconnects, AseptiQuick (AQG) sterile connectors and other such fitting that would allow for the creation of sterile connections, septums for sampling, filters, bearings such as agitator shaft bearings and bearing assemblies, viewports, and probe ports. Formulators of the instant invention can also comprise devices such as light emitting diodes (LEDs) that direct specific electromagnetic energy at a specific wavelength into the fluidic path to participate in a process. Such devices can direct the energy through portions in the conduits made of translucent/transparent material. Alternatively, electromagnetic energy devices can be attached in line in the fluidic path.

The formulator can further comprise contact or contactless measuring systems, which may comprise instruments operable to measure, for example, quantity (i.e., volume, weight, etc.), analyte identity and/or concentration, flow rate, temperature, pressure, turbidly, color, reagent use, reagent verification, and product verification. The measurement of the ingredients in the conduits may be performed using spectroscopic analysis, ultrasonic detection, or optical detection. Reagent verification, product verification, analyte identity and concentration analysis within the process chamber may be performed using a range of analytical instruments, such as liquid chromatography (LC), high performance liquid chromatography (HPLC) with or without UV-VIS, UV-VIS-DAD, and/or mass spectrometry (MS) detectors, electromagnetic radiation spectroscopy, such as UV/Vis NIRF, FTIR, and RAMAN, and combinations thereof.

In some aspects, the temperature of fluid in the system may be monitored using a touchless temperature sensor. Non-limiting examples of suitable touchless temperature sensors include infrared temperature sensors. Exemplary commercially available temperature sensors include Melexis Technologies NV part number MLX90614KSF-ACC-000-TU-ND.

A formulator device can also comprise a temperature control device operable to control the temperature of the fluid in the system. The temperature control device can control temperature by conductive, thermoelectric, resistance heating, impedance, temperature modulation using induction, microwave dielectric heating, and any combination thereof. Non-limiting examples of temperature control devices include heat exchanger plates or other heating elements on the exterior of the conduits, heating elements in the conduits, and jackets surrounding the conduits and/or vessel adapted to regulate the temperature of the fluid by providing sources of heating and cooling.

(d) Computer Implemented Control System

As described in Section I(a) herein above, some aspects of the system include a controller in functional communication with the pump and the plurality of valves or other components of the system, including weight scales, stirring mechanisms, shakers, and the like. The controller can be, according to some aspects, a computer implemented control system.

The computer implemented control system can be used to operate various components of the fluidic system. In general, any calculation methods, steps, simulations, algorithms, systems, and system elements described herein may be implemented and/or controlled using one or more computer implemented control system(s), such as the various embodiments of computer implemented systems described below. The methods, steps, control systems, and control system elements described herein are not limited in their implementation to any specific computer system described herein, as many other different machines may be used.

The computer implemented control system can be part of or coupled in operative association with one or more components that might be automated, and, in some aspects, is configured and/or programmed to control and adjust operational parameters, as well as receive and analyze and calculate values, such as flow rate, fluid pressure in the conduits, and the like. In some aspects, the computer implemented control system(s) can send and receive reference signals to set and/or control operating parameters of system apparatus. In other embodiments, the computer implemented system(s) can be separate from and/or remotely located with respect to the other system components and may be configured to receive data from one or more systems of the invention via indirect and/or portable means, such as via portable electronic data storage devices, such as magnetic disks, or via communication over a computer network, such as the Internet or a local intranet.

The computer implemented control system(s) can include several known components and circuitry, including a processor, a memory system, input and output devices and interfaces (e.g., an interconnection mechanism), as well as other components, such as transport circuitry (e.g., one or more busses), a video and audio data input/output (I/O) subsystem, special-purpose hardware, as well as other components and circuitry, as described below in more detail. Further, the computer system(s) can be a multi-processor computer system or may include multiple computers connected over a computer network.

The computer implemented control system(s) can include a processor, for example, a commercially available processor such as one of the series x86, Celeron and Pentium processors, available from Intel, similar devices from AMD and Cyrix, the 680X0 series microprocessors available from Motorola, and the PowerPC microprocessor from IBM. Many other processors are available, and the computer system is not limited to a particular processor.

A processor typically executes a program called an operating system, of which Windows, UNIX, Linux, DOS, VMS, and MacOS are examples, which controls the execution of other computer programs and provides scheduling, debugging, input/output control, accounting, compilation, storage assignment, data management and memory management, communication control and related services. The processor and operating system together define a computer platform for which application programs in high-level programming languages are written. The computer implemented control system is not limited to a particular computer platform.

The computer implemented control system(s) can include a memory system, which typically includes a computer readable and writeable non-volatile recording medium, of which a magnetic disk, optical disk, a flash memory and tape are examples. Such a recording medium can be removable, for example, a floppy disk, read/write CD or memory stick, or may be permanent, for example, a hard drive.

Such a recording medium stores signals, typically in binary form (i.e., a form interpreted as a sequence of one and zeros). A disk (e.g., magnetic or optical) has a number of tracks, on which such signals may be stored, typically in binary form, i.e., a form interpreted as a sequence of ones and zeros. Such signals can define a software program, e.g., an application program, to be executed by the microprocessor, or information to be processed by the application program.

The memory system of the computer implemented control system(s) also can include an integrated circuit memory element, which typically is a volatile, random access memory such as a dynamic random access memory (DRAM) or static memory (SRAM). Typically, in operation, the processor causes programs and data to be read from the non-volatile recording medium into the integrated circuit memory element, which typically allows for faster access to the program instructions and data by the processor than does the non-volatile recording medium.

The processor generally manipulates the data within the integrated circuit memory element in accordance with the program instructions and then copies the manipulated data to the non-volatile recording medium after processing is completed. A variety of mechanisms are known for managing data movement between the non-volatile recording medium and the integrated circuit memory element, and the computer implemented control system(s) that implements the methods, steps, systems control and system elements control described above is not limited thereto. The computer implemented control system(s) is not limited to a particular memory system.

At least part of such a memory system described above may be used to store one or more data structures (e.g., look-up tables) or equations such as calibration curve equations. For example, at least part of the non-volatile recording medium may store at least part of a database that includes one or more of such data structures. Such a database may be any of a variety of types of databases, for example, a file system including one or more flat-file data structures where data is organized into data units separated by delimiters, a relational database where data is organized into data units stored in tables, an object-oriented database where data is organized into data units stored as objects, another type of database, or any combination thereof.

The computer implemented control system(s) may include one or more output devices. Example output devices include a cathode ray tube (CRT) display, liquid crystal displays (LCD) and other video output devices, printers, communication devices such as a modem or network interface, storage devices such as disk or tape, and audio output devices such as a speaker.

The computer implemented control system(s) also may include one or more input devices. Example input devices include a keyboard, keypad, track ball, mouse, pen and tablet, communication devices such as described above, and data input devices such as audio and video capture devices and sensors. The computer implemented control system(s) is not limited to the particular input or output devices described herein.

It should be appreciated that one or more of any type of computer implemented control system may be used to implement various embodiments described herein. Aspects of the invention may be implemented in software, hardware or firmware, or any combination thereof. The computer implemented control system(s) may include specially programmed, special purpose hardware, for example, an application-specific integrated circuit (ASIC). Such special-purpose hardware may be configured to implement one or more of the methods, steps, simulations, algorithms, systems control, and system elements control described above as part of the computer implemented control system(s) described above or as an independent component.

The computer implemented control system(s) and components thereof may be programmable using any of a variety of one or more suitable computer programming languages. Such languages may include procedural programming languages, for example, LabView, C, Pascal, Fortran and BASIC, object-oriented languages, for example, C++, Java and Eiffel and other languages, such as a scripting language or even assembly language.

The methods, steps, simulations, algorithms, systems control, and system elements control may be implemented using any of a variety of suitable programming languages, including procedural programming languages, object-oriented programming languages, other languages and combinations thereof, which may be executed by such a computer system. Such methods, steps, simulations, algorithms, systems control, and system elements control can be implemented as separate modules of a computer program, or can be implemented individually as separate computer programs. Such modules and programs can be executed on separate computers.

Such methods, steps, simulations, algorithms, systems control, and system elements control, either individually or in combination, may be implemented as a computer program product tangibly embodied as computer-readable signals on a computer-readable medium, for example, a non-volatile recording medium, an integrated circuit memory element, or a combination thereof. For each such method, step, simulation, algorithm, system control, or system element control, such a computer program product may comprise computer-readable signals tangibly embodied on the computer-readable medium that define instructions, for example, as part of one or more programs, that, as a result of being executed by a computer, instruct the computer to perform the method, step, simulation, algorithm, system control, or system element control.

In some aspects, it is contemplated that the processor can comprise an alarm system that can be activated in response to one or more inputs from a sensor. In these aspects, it is contemplated that the alarm system can comprise a conventional device for selectively generating optical, thermal, vibrational, and/or audible alarm signals.

In some aspects, when the formulator system of the instant disclosure is attached to and/or used in conjunction with a pharmaceutical on demand (POD) unit unit operable for production of a pharmaceutical, the controller can be adapted to communicate data with at least one processor and associated memory of the POD unit. For instance, the controller can be operable to communicate a signal to the processor and memory of the POD unit in response to sensor data indicating completion of a formulation process.

In some aspects, a system of the instant disclosure comprises a computer implemented control system comprising an input device and an output device. In some aspects, a system of the instant disclosure comprises a computer implemented control system comprising a keyboard and a computer screen.

(e) Aspects of Systems for Preparation of Liquid Formulations

Turning to the figures, FIGS. 6, and 10 show two aspects of a formulator system 100 of the instant disclosure for the preparation of a liquid formulation. The formulator system 100 comprises a consolette 300 and a fluidic path 110 functionally attached to the consolette 300. In the aspects shown in FIGS. 6 and 10, the formulator system 100 further comprises a mixing unit 200, an ingredients container 210, a formulation container 220, and a waste container 230 attached thereon. The mixing unit 200, the ingredients container 210, the formulation container 220, and the waste container 230 are placed on an ingredients container weight scale 240, a formulation container weight scale 245, and a waste container weight scale 250, respectively. FIG. 1 shows the formulator system 100 of FIG. 10 before installing the fluidic path 110 and associated components for use in a process for preparing a formulation.

The consolette 300 (FIG. 2 and FIG. 8) comprises a pump 305 operable to flow fluid through the fluidic path 110 and a plurality of valves 307, wherein each of the plurality of valves 307 comprises an open position and a closed position, and wherein each of the plurality of valves 307 is operable to allow flow of fluid through a conduit 116 of the fluidic path 110 when in the open position and prevent flow of fluid through the conduit 116 when in the closed position. The plurality of valves 307 are operable to be configured in two or more combinations (states) of open and closed positions thereby directing the flow of fluid through the plurality of fluidic channels 120, thereby forming a plurality of fluidic channels 120. In the aspects shown in the figures, the consolette further comprises a computer implemented control system (not shown) comprising a keyboard 410 and a screen 420 that can be used to provide feedback or instructions to a user.

The fluidic path 110 (FIG. 3 and FIG. 11A-B) comprises a configuration operable to form a plurality of fluidic channels 120. The fluidic path 110 comprise an inlet conduit 111 comprising an ingredient inlet port 112 for introducing ingredients of a liquid formulation into the fluidic path 110 and an outlet conduit 113 comprising a fill port 114 for dispensing the liquid formulation into a formulation container 220 at the end of a process of preparing a formulation. The fluidic path 110 also comprises a filter 130 fluidically connected to the fluidic path, wherein the filter is operable to filter fluid pumped through the fluidic path. In addition, the fluidic path 110 comprise a mixing unit 200 that is fluidically connected to the fluidic path 110, wherein the mixing unit 200 is operable to mix the ingredients of the liquid formulation in a process of preparing the liquid formulation.

As explained above, the formulator system 100 of the instant disclosure can be configured for use in compounding different drug products. FIG. 6, shows an aspect of the formulator system 100 that can be used for compounding a liquid formulation of cisatracurium. The formulator system 100 of FIG. 6 comprises a consolette 300 (FIG. 2) shown before attaching the fluidic path 110 shown in (FIG. 3). The consolette 300 comprises nine valves 307, a pump 305, and a filter holder 309. The fluidic path 110 (FIG. 3) includes a mixing unit 200, an ingredients container 210 fluidically connected to the ingredient inlet port 112, a formulation container 220 fluidically connected to fill port 114, and a waste container 230 fluidically connected to the waste port 115. FIG. 6 shows the fluidic path 110 installed onto the consolette 300. In FIG. 6, the ingredients container 210, the formulation container 220, and the waste container 230 are placed on an ingredients container weight scale 240, a formulation container weight scale 245, and a waste container weight scale 250, respectively. The mixing unit 200 comprises a mixing bag 202 placed on a platform shaker 204.

Figure 4:
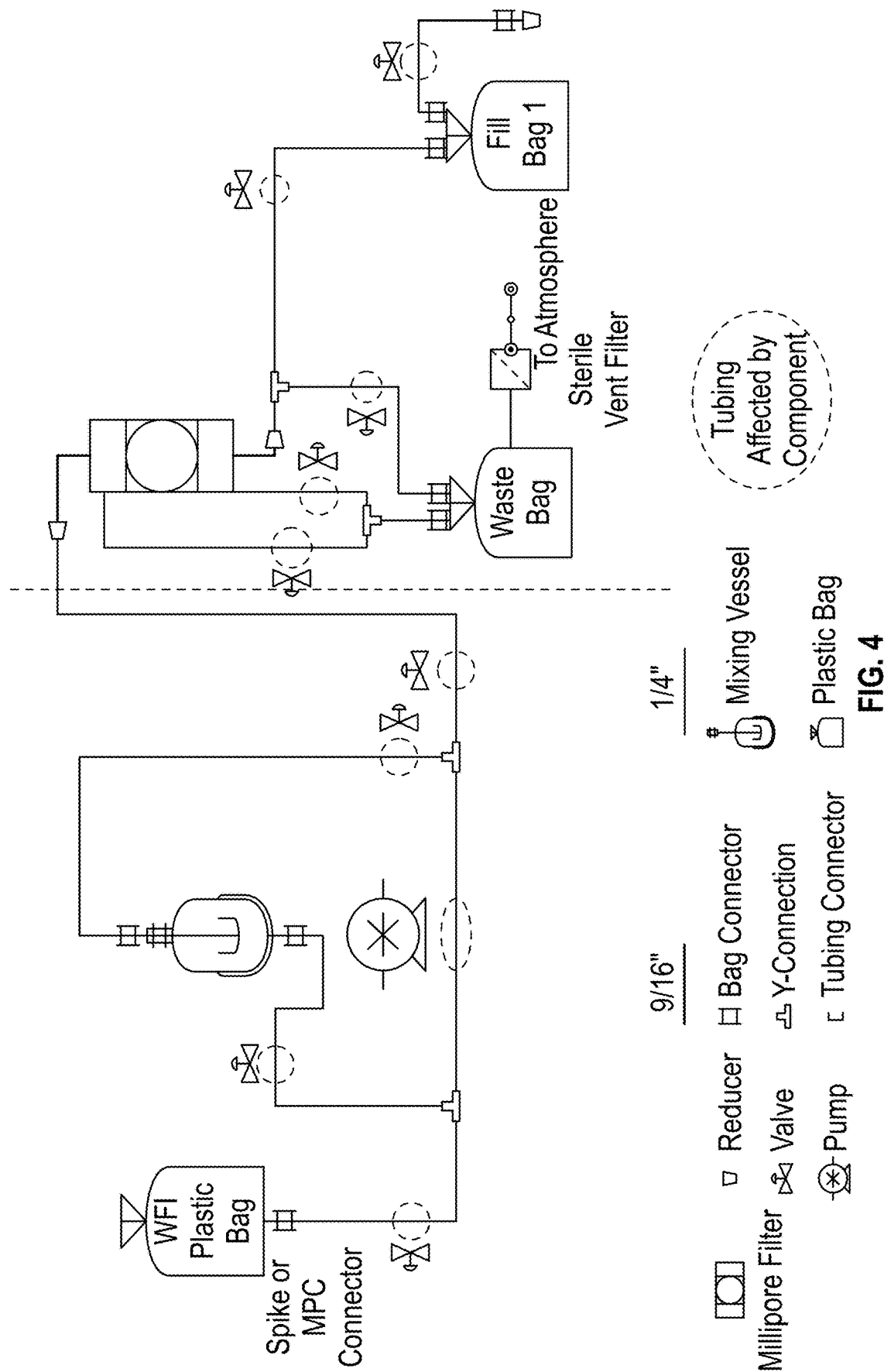
FIG. 4 shows a process flow diagram for preparing a formulation of cisatracurium.
Figure 7:
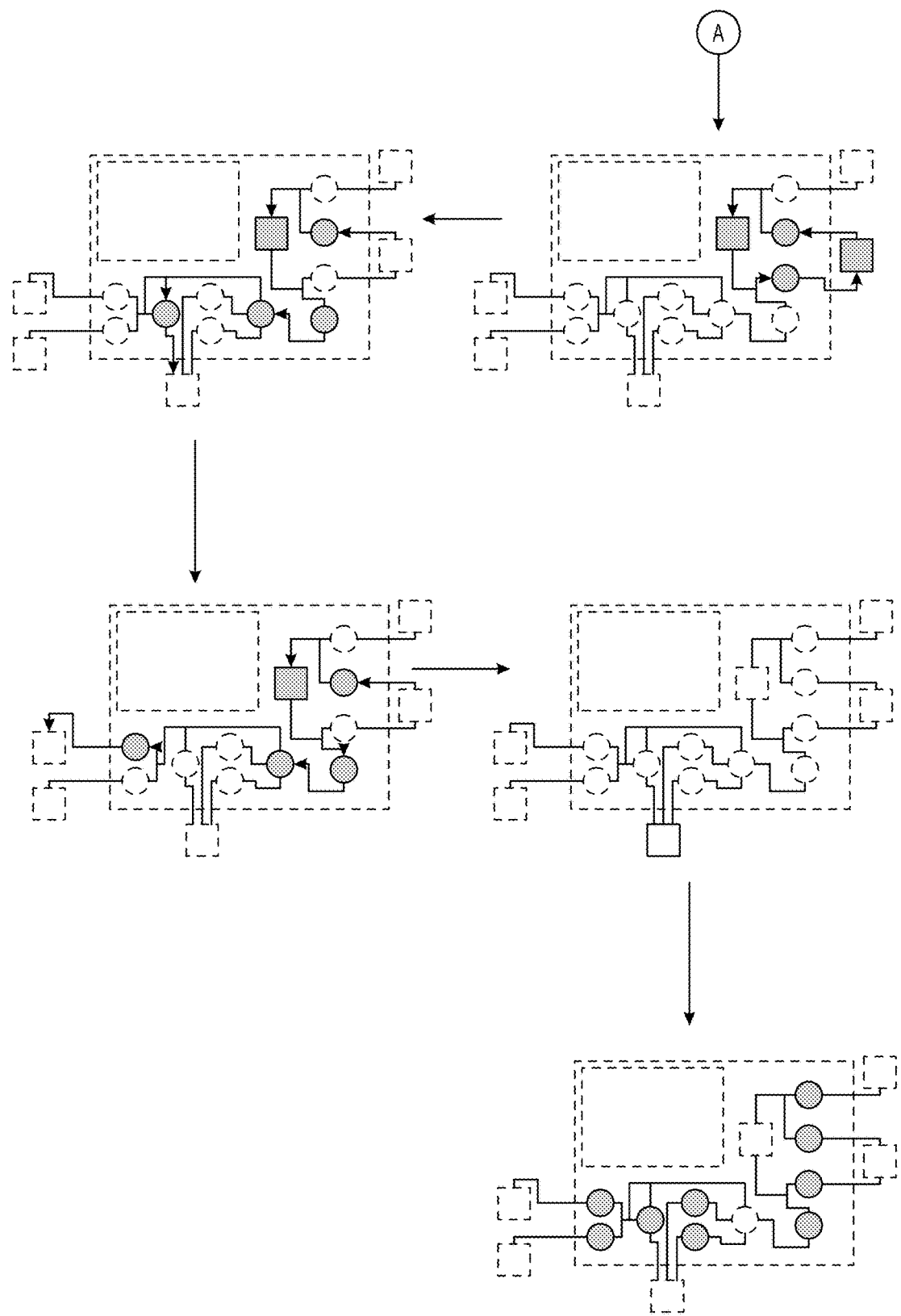
FIG. 7 shows a sequence of combinations of valve configurations used during a process of preparing a formulation.
Figure 7:
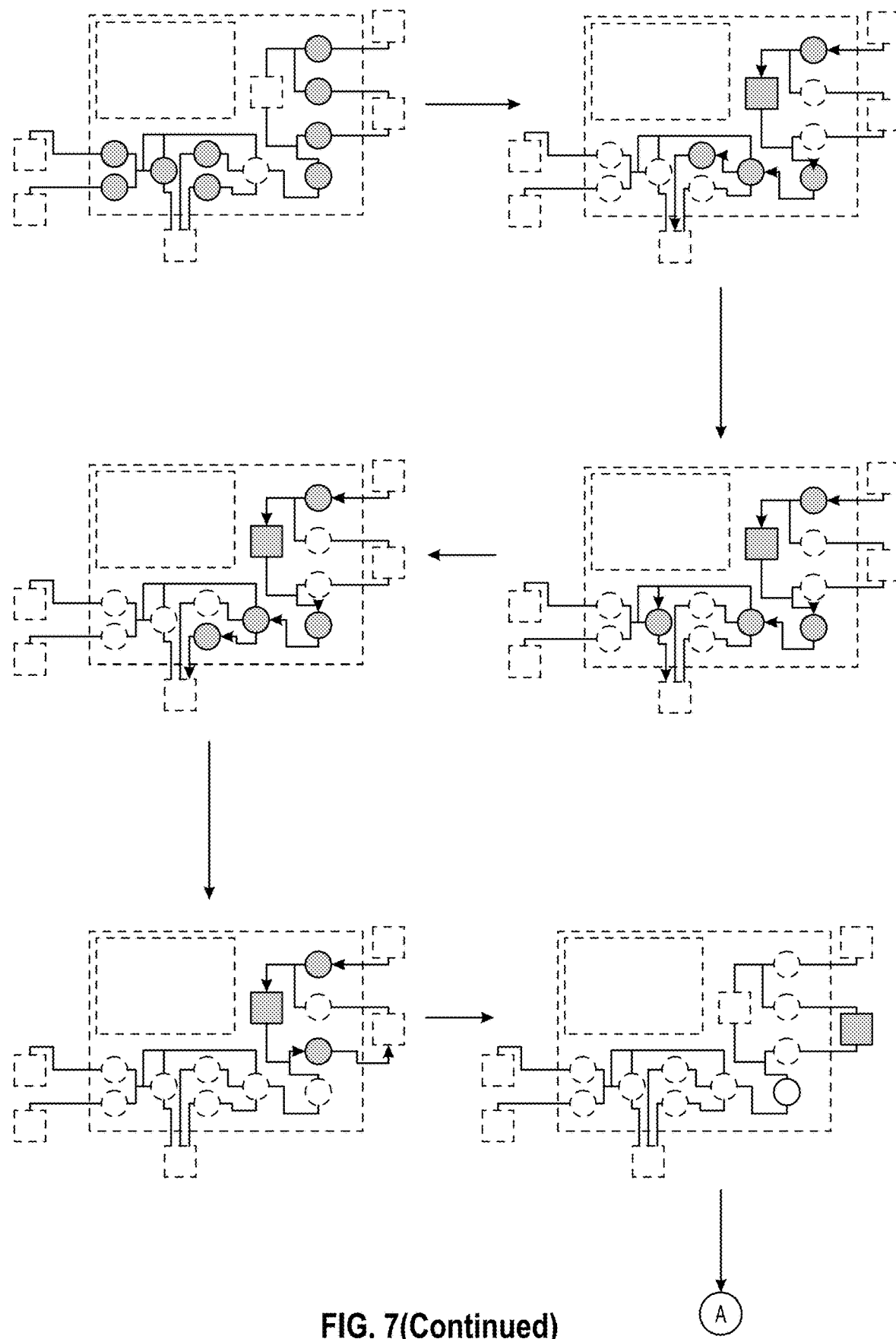

A process flow diagram for preparing a formulation of cisatracurium is shown in FIG. 4. Using the formulator system 100 of FIG. 6, preparing the formulation of cisatracurium according to the process flow diagram of FIG. 4 can comprise configuring the nine valves of the consolette 300 into six or more combinations of open and closed configurations to form the following fluid paths shown in FIG. 6: (1) a fill channel 310 extending from the ingredients container 210 to the mixing unit 200 through the mixing unit inlet port 201; (2) a closed loop mixing channel 320 extending from the mixing unit 200 through the mixing unit inlet port 201, one or more conduits 116, and back to the mixing unit 200 through the mixing unit outlet port 203; (3) a dispensing channel 330 extending from the mixing unit 200 through the filter 130 at the filter inlet port 140 and the filter outlet port 150, to the fill port 114; (4) a first filter purging channel 340 extending from the ingredient inlet port 112 through the top vent port 160 of the filter 130 to the waste port 115; (5) a second filter purging channel 350 extending from the ingredient inlet port 112 through the bottom vent port 170 of the filter 130 to the waste port 115; and (6) a filter priming channel 360 extending from the ingredient inlet port 112, through the filter inlet port 140 and the filter outlet port 150 of the filter 130 to the waste port 115. The sequence of valve configurations that can be used to switch to all these configurations and make the process is shown in FIG. 7 and is as explained In Section II herein below.

FIG. 10, shows an aspect of the formulator system 100 that can be used for compounding a liquid formulation of midazolam. The formulator system 100 of FIG. 10 comprises a consolette 300 (FIG. 8) shown before attaching the fluidic path 110 shown in FIG. 11A and FIG. 11B. In this aspect, the fluidic path comprises two waste containers; a purge waste container 230 fluidically connected to a purge waste port 115, and a filter prime waste container 231 connected to a filter prime waste port 117. This configuration separates the two waste streams for additional protection against contamination. The consolette 300 comprises eight valves 307, a pump 305, and a filter holder 309. The fluidic path 110 includes a mixing unit 200, an ingredients container 210 fluidically connected to the ingredient inlet port 112, a formulation container 220 fluidically connected to fill port 114, the purge waste container 230 fluidically connected to a purge waste port 115, and a filter prime waste container 231 connected to a filter prime waste port 117. FIG. 10 shows the fluidic path 110 shown in FIG. 11A and FIG. 11B installed onto the consolette 300. In FIG. 10, the ingredients container 210, the formulation container 220, and the waste container 230 are placed on an ingredients container weight scale 240, a formulation container weight scale 245, and a waste container weight scale 250, respectively. The mixing unit 200 comprises a mixing bag 202 placed on a platform shaker 204.

Figure 9:
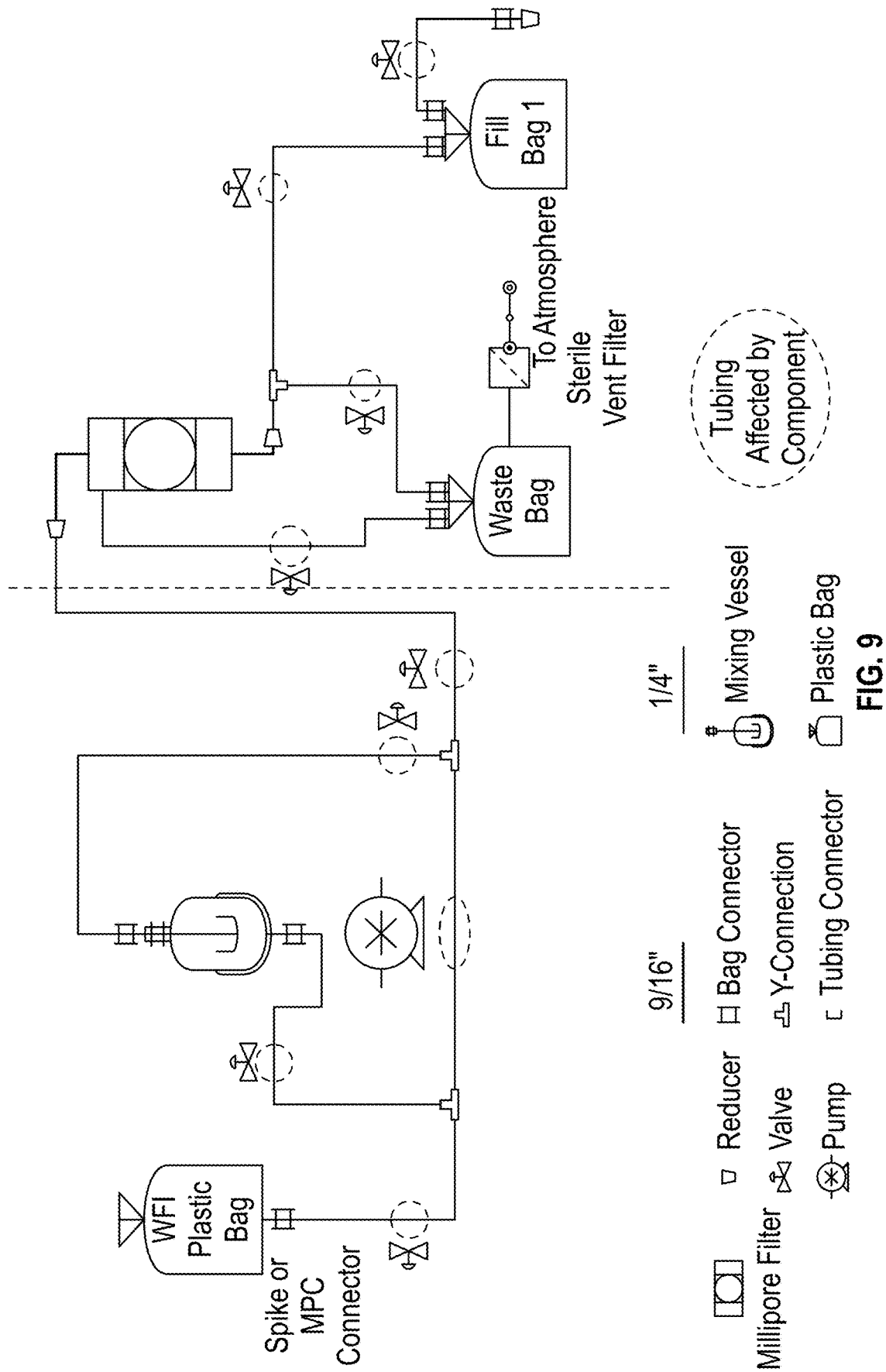
FIG. 9 shows a process flow diagram for preparing a formulation of midazolam.

A process flow diagram for preparing a formulation of midazolam is shown in FIG. 9. Using the formulator system 100 of FIG. 10, preparing the formulation of midazolam according to the process flow diagram of FIG. 9 can comprise configuring the eight valves of the consolette 300 into 5 combinations of open and closed configurations to form the following fluid paths shown in FIG. 10: (1) a fill channel 310 extending from the ingredients container 210 to the mixing unit 200; (2) a closed loop mixing channel 320 extending from the mixing unit 200, one or more conduits 116, and back to the mixing unit 200; (3) a dispensing channel 330 extending from the mixing unit 200 through the filter 130 at the filter inlet port 140 and the filter outlet port 150, to the fill port 114; (4) a filter purging channel 340 extending from the ingredient inlet port 112 through the vent port 160 of the filter 130 to the waste port 117 of purge waste container 231; and (5) a filter priming channel 360 extending from the ingredient inlet port 112, through the filter inlet port 140 and the filter outlet port 150 of the filter 130 to the waste port 115 of purge bag 230.

II. Process

Another aspect of the instant disclosure encompasses a process of preparing a liquid formulation using a formulator system of the instant disclosure. In some aspects, the process comprises preparing a formulation of an API. The method comprises combining an API with excipients using an operational sequence for preparing the formulation. As used herein, the term "API" or "active pharmaceutical ingredient" (also referred to as a "drug") refers to an agent that is administered to a subject to treat a disease, disorder, or other clinically recognized condition, or for prophylactic purposes, and has a clinically significant effect on the body of the subject to treat and/or prevent the disease, disorder, or condition. Active pharmaceutical ingredients include, for example, without limitation, agents listed in the United States Pharmacopeia (USP). In some aspects, the active pharmaceutical ingredient is one that has already been deemed safe and effective for use in humans or animals by the appropriate governmental agency or regulatory body. For example, drugs approved for human use are listed by the FDA under 21 C.F.R. §§ 330.5, 331 through 361, and 440 through 460, incorporated herein by reference; drugs for veterinary use are listed by the FDA under 21 C.F.R. §§ 500 through 589, incorporated herein by reference. All listed drugs are considered acceptable for use in accordance with the present invention.

In certain aspects, the active pharmaceutical ingredient is a small molecule. Exemplary active pharmaceutical ingredients include, but are not limited to, adrenergic blocking agents, anabolic agents, androgenic steroids, antacids, anti-asthmatic agents, anti-allergenic materials, anti-cholesterolemic and anti-lipid agents, anti-cholinergics and sympathomimetics, anti-coagulants, anti-convulsants, anti-diarrheal, anti-emetics, anti-hypertensive agents, anti-infective agents, anti-inflammatory agents such as steroids, non-steroidal anti-inflammatory agents, antimalarials, anti-manic agents, anti-nauseants, anti-neoplastic agents, anti-obesity agents, anti-parkinsonian agents, anti-pyretic and analgesic agents, anti-spasmodic agents, anti-thrombotic agents, anti-uricemic agents, anti-anginal agents, antihistamines, anti-tussives, appetite suppressants, benzophenanthridine alkaloids, biologicals, cardioactive agents, cerebral dilators, coronary dilators, decongestants, diuretics, diagnostic agents, erythropoietic agents, estrogens, expectorants, gastrointestinal sedatives, agents, hyperglycemic agents, hypnotics, hypoglycemic agents, ion exchange resins, laxatives, mineral supplements, mitotics, mucolytic agents, growth factors, neuromuscular drugs, nutritional substances, peripheral vasodilators, progestin agents, prostaglandins, psychic energizers, psychotropics, sedatives, stimulants, thyroid and anti-thyroid agents, tranquilizers, uterine relaxants, vitamins, antigenic materials, and prodrugs, etc. Non-limiting examples of APIs include propofol, midazolam, cisatracurium, ciprofloxacin, and others.

As used herein, the term "pharmaceutically acceptable excipient" means a non-toxic, inert solid, semi-solid or liquid filler, diluent, encapsulating material, or formulation auxiliary of any type. Some non-limiting examples of materials which can serve as pharmaceutically acceptable excipients are sugars such as lactose, glucose, and sucrose; starches such as corn starch and potato starch; cellulose and its derivatives such as sodium carboxymethyl cellulose, methylcellulose, hydroxypropylmethylcellulose, ethyl cellulose, and cellulose acetate; powdered tragacanth; malt;

gelatin; talc; excipients such as cocoa butter and suppository waxes; oils such as peanut oil, cottonseed oil; safflower oil; sesame oil; olive oil; corn oil and soybean oil; glycols such as propylene glycol; esters such as ethyl oleate and ethyl laurate; agar; detergents such as Tween 80; buffering agents such as magnesium hydroxide and aluminum hydroxide; alginic acid; water (e.g., pyrogen free water); isotonic saline; citric acid, acetate salts, Ringer's solution; ethyl alcohol; and phosphate buffer solutions, as well as other non-toxic compatible lubricants such as sodium lauryl sulfate and magnesium stearate, as well as coloring agents, releasing agents, coating agents, sweetening, flavoring and perfuming agents, preservatives and antioxidants can also be present in the composition, according to the judgment of the formulator.

The prepared formulations can be used to produce pharmaceutical compositions for parenteral administration (including subcutaneous, intradermal, intravenous, intramuscular, and intraperitoneal). Formulations for parenteral administration can be an aqueous or an oil-based solution. Aqueous solutions may include a sterile diluent such as water, saline solution, a pharmaceutically acceptable polyol such as glycerol, propylene glycol, or other synthetic solvents; an antibacterial and/or antifungal agent such as benzyl alcohol, methyl paraben, chlorobutanol, phenol, thimerosal, and the like; an antioxidant such as ascorbic acid or sodium bisulfite; a chelating agent such as etheylenediaminetetraacetic acid; a buffer such as acetate, citrate, or phosphate; and/or an agent for the adjustment of tonicity such as sodium chloride, dextrose, or a polyalcohol such as mannitol or sorbitol. The pH of the aqueous solution may be adjusted with acids or bases such as hydrochloric acid or sodium hydroxide. Oil-based solutions or suspensions may further comprise sesame, peanut, olive oil, or mineral oil.

Figure 5:
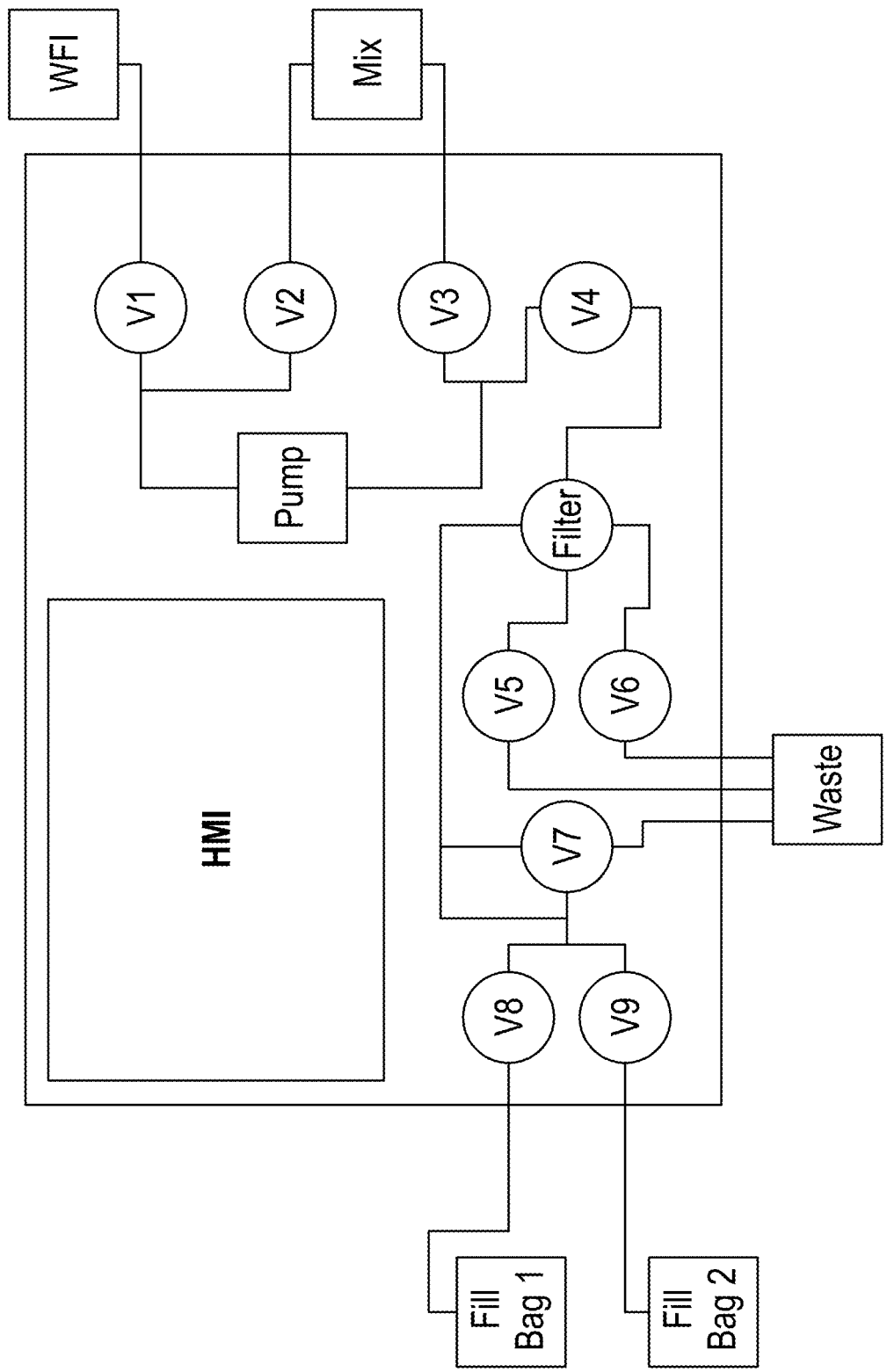
FIG. 5 shows a consolette and a configuration of a fluidic path when attached thereon.

Referring to FIG. 7, an aspect of a method of preparing a liquid formulation of cisatracurium is shown. The method comprises attaching a fluidic path to a consolette in a configuration as shown in FIG. 5. First, all valves of the console are configured in the open position so the fluidic path can be attached to all valves and the pump, and to install the filter in the filter holder (first panel of FIG. 7). The waste container is also attached to the fluidic path and is placed on a waste weight scale, and the mixing unit comprising cisatracurium and excipient powders is rested on a shaker. The valves are then all closed, and the ingredients container (saline bag) is attached to the ingredients inlet port and the formulation container is attached to the dispensing port. The valves are then configured as in the second panel of FIG. 7, and a volume of saline or water is pumped through the top section of the filter to purge air. The valves are then configured as in the third panel of FIG. 7, and a volume of saline or water is pumped through the bottom section of the filter to purge air. The valves are then configured as in the fourth panel of FIG. 7, and a volume of saline or water is pumped through the inlet port of the filter to flush the product line. The pump can be calibrated at this stage using this configuration of valves. The valves are then configured as in the fifth panel of FIG. 7, and a volume of saline or water is pumped into the mixing container to dissolve the powders. The mixer is activated to mix the contents of the mixing container to facilitate dissolution. The valves can be configured as in the sixth panel of FIG. 7 for the duration of the mixing step. The valves can then configured as in the seventh panel of FIG. 7 and the liquid in the mixing unit is circulated in a loop through the pump and back into the container to further facilitate in mixing. The pump can alternate directions in this step to further facilitate in mixing. The valves are then configured as in the eighth panel of FIG. 7 to run some of the formulation through the filter to purge the saline (water) out of the filter. The valves are then configured as in the ninth panel of FIG. 7 to fill the formulation container with the formulation. In this aspect, two formulation containers can be filled by actuating the appropriate valve. The valves are then configured as in the 10th panel of FIG. 7 to close all the volves and remove the full formulation containers and possibly other containers attached to the fluidic path. The valves can then be configured as in the 11$^{th}$ panel of FIG. 7 to remove the fluidic path.

Definitions

Unless defined otherwise, all technical and scientific terms used herein have the meaning commonly understood by a person skilled in the art to which this invention belongs.

When introducing elements of the present disclosure or the preferred aspects(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above-described cells and methods without departing from the scope of the invention, it is intended that all matter contained in the above description and in the examples given below, shall be interpreted as illustrative and not in a limiting sense.

EXAMPLES

All patents and publications mentioned in the specification are indicative of the levels of those skilled in the art to which the present disclosure pertains. All patents and publications are herein incorporated by reference to the same extent as if each individual publication was specifically and individually indicated to be incorporated by reference.

The publications discussed throughout are provided solely for their disclosure before the filing date of the present application. Nothing herein is to be construed as an admission that the invention is not entitled to antedate such disclosure by virtue of prior invention.

The following examples are included to demonstrate the disclosure. It should be appreciated by those of skill in the art that the techniques disclosed in the following examples represent techniques discovered by the inventors to function well in the practice of the disclosure. Those of skill in the art should, however, in light of the present disclosure, appreciate that many changes could be made in the disclosure and still obtain a like or similar result without departing from the spirit and scope of the disclosure, therefore all matter set forth is to be interpreted as illustrative and not in a limiting sense.

Example 1. Preparation of a Cisatracurium Liquid Formulation

In one aspect, the formulator of the instant disclosure is used to prepare an injectable formulation of cisatracurium. A preassembled fluidic path developed for this process is attached to the consolette, and a mix bag and a saline bag are attached to the conduits as starting material. The fluidic path comprises a filter. A fill bag is also attached for collecting the final formulated product. The formulator setup is shown in FIG. 6 with the components installed. The mix bag contains pre-measured cisatracurium and bovine serum albumin (BSA) and is placed on an orbital shaker, while saline and fill bags are placed on their respective scales.

The process of formulation starts with priming the sterilizing filter by flowing saline to purge air out of the filter through vent ports and washing the membrane using saline. The next step is adding saline to the mix bag through the green flow path and based on the weight reading of the saline scale according to the target drug product dosage. The final step is to move the formulated drug product from the mix bag into the fill bag while sterilizing it using the filter.

Example 2. Preparation of a Midazolam Liquid Formulation

In one aspect, the formulator of the instant disclosure is used to prepare an injectable formulation of midazolam. A preassembled fluidic path developed for this process is attached to the consolette, and a mix bag and a saline bag are attached to the conduits as starting material. The fluidic path comprises a filter. A fill bag is also attached for collecting the final formulated product. The formulator setup is shown in FIG. 10 with the components installed. The mix bag contains pre-measured midazolam and bovine serum albumin (BSA) and is placed on an orbital shaker, while saline and fill bags are placed on their respective scales.

The process of formulation starts with priming the sterilizing filter by flowing saline to purge air out of the filter through vent ports and washing the membrane using saline. The next step is adding saline to the mix bag through the green flow path and based on the weight reading of the saline scale according to the target drug product dosage. The final step is to move the formulated drug product from the mix bag into the fill bag while sterilizing it using the filter.

What is claimed is:

1. A system for preparation of a liquid formulation, the system comprising:
   a. a plurality of fluidic channels including a plurality of conduits configured to form a fluidic path, wherein the fluidic path comprises:
      i. an inlet conduit comprising an ingredient inlet port for introducing ingredients of a liquid formulation into the fluidic path and an outlet conduit comprising a dispensing port for dispensing the liquid formulation;
      ii. a filter fluidically connected to one or more channels of the plurality of fluidic channels in the fluidic path, wherein the filter is operable to filter fluid pumped through the one or more channels of the plurality of fluidic channels; and
      iii. a mixing unit fluidically connected to the plurality of fluidic channels in the fluidic path such that the mixing unit is operable to receive the ingredients, wherein the mixing unit is operable to mix the ingredients of the liquid formulation, wherein the mixing unit is upstream of the filter;
   b. a consolette operable to be connected with the plurality of fluidic channels of the fluidic path, wherein the consolette is operable to control flow of fluid through the fluidic path, the consolette comprising:
      i. a pump functionally attached to a frame, wherein the pump is operable to flow fluid through the plurality of fluidic channels; and
      ii. a plurality of valves functionally attached to the frame, wherein each of the plurality of valves comprises an open position and a closed position, and wherein each of the plurality of valves is configured to independently open and close thereby directing the flow of fluid through the plurality of fluidic channels.

2. The system of claim 1, wherein the consolette further comprises a controller in functional communication with the pump and the plurality of valves, wherein the controller is operable to control the pump and the plurality of valves and thereby control the flow of fluid through the plurality of fluidic channels.

3. The system of claim 1, wherein the plurality of valves are configured to fill a channel with ingredients, the channel extending from the ingredient inlet port to the mixing unit.

4. The system of claim 1, wherein each of the plurality of valves are operable to transition between the open and closed positions to form a closed loop mixing path in the plurality of fluidic channels that flows from the mixing unit, through one or more conduits of the plurality of conduits, and back to the mixing unit.

5. The system of claim 1, wherein each of the plurality of valves are operable to transition between the open and closed positions to form a dispensing path in the plurality of fluidic channels that flows from the mixing unit through the filter to the dispensing port.

6. The system of claim 1, wherein the fluidic path further comprises a waste port and optionally a waste container fluidically connected to the waste port, wherein the waste port is downstream of the filter.

7. The system of claim 6, wherein each of the plurality of valves are operable to transition between the open and closed positions to form a waste path in the plurality of fluidic channels that flows from the ingredient inlet port through the filter to the waste port.

8. The system of claim 6, wherein each of the plurality of valves are operable to transition between the open and closed positions to form a filter wash path in the plurality of fluidic channels that flows from the mixing unit through the filter to the waste port.

9. The system of claim 1, wherein the fluidic path comprises a dispensing path extending from the mixing unit through a filter inlet port and a filter output port of the filter, to the dispensing port.

10. The system of claim 1, wherein the mixing mechanism unit includes an orbital shaker.

11. The system of claim 1, wherein the system further comprises an ingredients container fluidically attached to the ingredient inlet port and a formulation container fluidically attached to the dispensing port.

12. The system of claim 11, wherein the system further comprises one or more weight scales operable to receive the mixing unit, the ingredients container, the formulation container, or any combination thereof, the one or more weight scales operable to weigh the mixing unit, the ingredients container, the formulation container or any combination thereof.

13. The system of claim 1, further comprising sensors in functional communication with components of the system and/or with a fluid in the plurality of fluidic channels,
   wherein the sensors are operable to sense at least one of the following: weight, fluid flow, temperature, pH, oxygen, pressure, concentration, and specific compounds in the fluid.

14. The system of claim 1, wherein the system, to prepare a liquid formulation of cisatracurium, comprises:
   a. the fluidic path comprising:
      i. an ingredients container fluidically attached to the ingredient inlet port and a formulation container fluidically attached to the dispensing port;
      ii. the filter comprising a top section comprising a top vent port, a bottom section comprising a bottom vent port, a filter inlet port, and a filter outlet port;
      iii. the mixing unit operable to mix the ingredients of the liquid formulation; and iv. a waste container fluidically connected to the waste port; and
b. the consolette comprising:
i. nine valves;
ii. an ingredients container weight, a mixing unit weight scale, and a waste container weight scale; and
iii. a controller in functional communication with the pump, the nine valves, and the weight scales;
wherein the plurality of valves are configurable in a combination of open and closed positions to form: (1) a fill path extending from the ingredients container to the mixing unit; (2) a closed loop mixing path extending from the mixing unit, through one or more of the plurality of conduits, and back to the mixing unit; (3) a dispensing path extending from the mixing unit through the filter at the filter inlet port and the filter outlet port, to the formulation container through the fill port; (4) a filter purging path extending from the ingredient inlet port through the vent port of the filter to the waste port; (5) a filter priming path extending from the ingredient inlet port, through the filter inlet port and the filter outlet port of the filter to the waste port.

15. The system of claim 1, wherein the system, to prepare a liquid formulation of 8-chloro-6-(2-fluorophenyl)-1-methyl-4H-imidazo[1,5-a][1,4]benzodiazepine, comprises:
a. the fluidic path comprising:
i. an ingredients container fluidically attached to the ingredient inlet port and a formulation container fluidically attached to the dispensing port;
ii. the filter comprising a vent port, a filter inlet port, and a filter outlet port;
iii. the mixing unit operable to mix the ingredients of the liquid formulation;
iv. a waste container fluidically connected to the waste port;
b. the consolette comprising:
i. nine valves;
ii. an ingredients container weight, a mixing unit weight scale, and a waste container weight scale;
iii. a controller in functional communication with the pump, the nine valves, and the weight scales;
wherein the plurality of valves are configurable in a combination of open and closed positions to form: (1) a fill path extending from the ingredients container to the mixing unit; (2) a closed loop mixing path extending from the mixing unit, one or more of the plurality of conduits, and back to the mixing unit; (3) a dispensing path extending from the mixing unit through the filter at the filter inlet port and the filter outlet port, to the formulation container through the fill port; (4) a filter purging path extending from the ingredient inlet port through the vent port of the filter to the waste port; (5) a filter priming path extending from the ingredient inlet port, through the filter inlet port and the filter outlet port of the filter to the waste port.

* * * * *